United States Patent [19]
Del Genio et al.

[11] Patent Number: 6,034,850
[45] Date of Patent: Mar. 7, 2000

[54] TWO-PART TAPE CARTRIDGE REEL LOCKING MECHANISM

[75] Inventors: Joseph A. Del Genio, Marlborough, Mass.; Joe Stabile, Colorado Springs, Colo.

[73] Assignee: Quantum Corporation, Milpitas, Calif.

[21] Appl. No.: 08/868,596

[22] Filed: Jun. 3, 1997

[51] Int. Cl.[7] ........................... G11B 23/02; G03B 23/02
[52] U.S. Cl. ........................................ 360/132; 242/338.1
[58] Field of Search ............... 360/132; 242/348–348.4, 242/343–343.2, 338.1, 338.2, 338.3

[56] References Cited

U.S. PATENT DOCUMENTS

| | | | |
|---|---|---|---|
| 3,394,898 | 7/1968 | Laa | 242/55.13 |
| 3,608,908 | 9/1971 | Yamamoto et al. | 274/4 F |
| 3,864,744 | 2/1975 | Uemura | 360/96 |
| 4,060,838 | 11/1977 | Meermans | 360/96 |
| 4,402,024 | 8/1983 | Kato | 360/96.5 |
| 4,555,077 | 11/1985 | Platter | 242/198 |
| 4,878,139 | 10/1989 | Hasagawa | 360/99.02 |
| 5,027,249 | 6/1991 | Johnson et al. | 360/132 |
| 5,181,153 | 1/1993 | Nishimura | 360/132 |
| 5,297,754 | 3/1994 | Albrecht et al. | 242/198 |

*Primary Examiner*—A. J. Heinz
*Attorney, Agent, or Firm*—David B. Harrison; John C. Chen

[57] ABSTRACT

A two-part tape cartridge locking mechanism for releasably locking a rotatable tape reel against rotation within a tape cartridge housing. A bias spring urges the tape reel against a major wall of the tape cartridge housing along an axis of rotation. A first part of the lock comprises a reel locking feature of the reel facing the major wall, and a housing locking feature of the major wall facing the reel locking feature, such that the reel locking feature engages the housing locking feature in a contact relationship when the tape reel is forced toward the major wall by the bias spring. A second part of the lock comprises a separately actuable reel lock mounted to the housing for holding the tape reel locking feature in the contact relationship with the housing locking feature until the reel lock is separately actuated away from the tape reel.

11 Claims, 17 Drawing Sheets

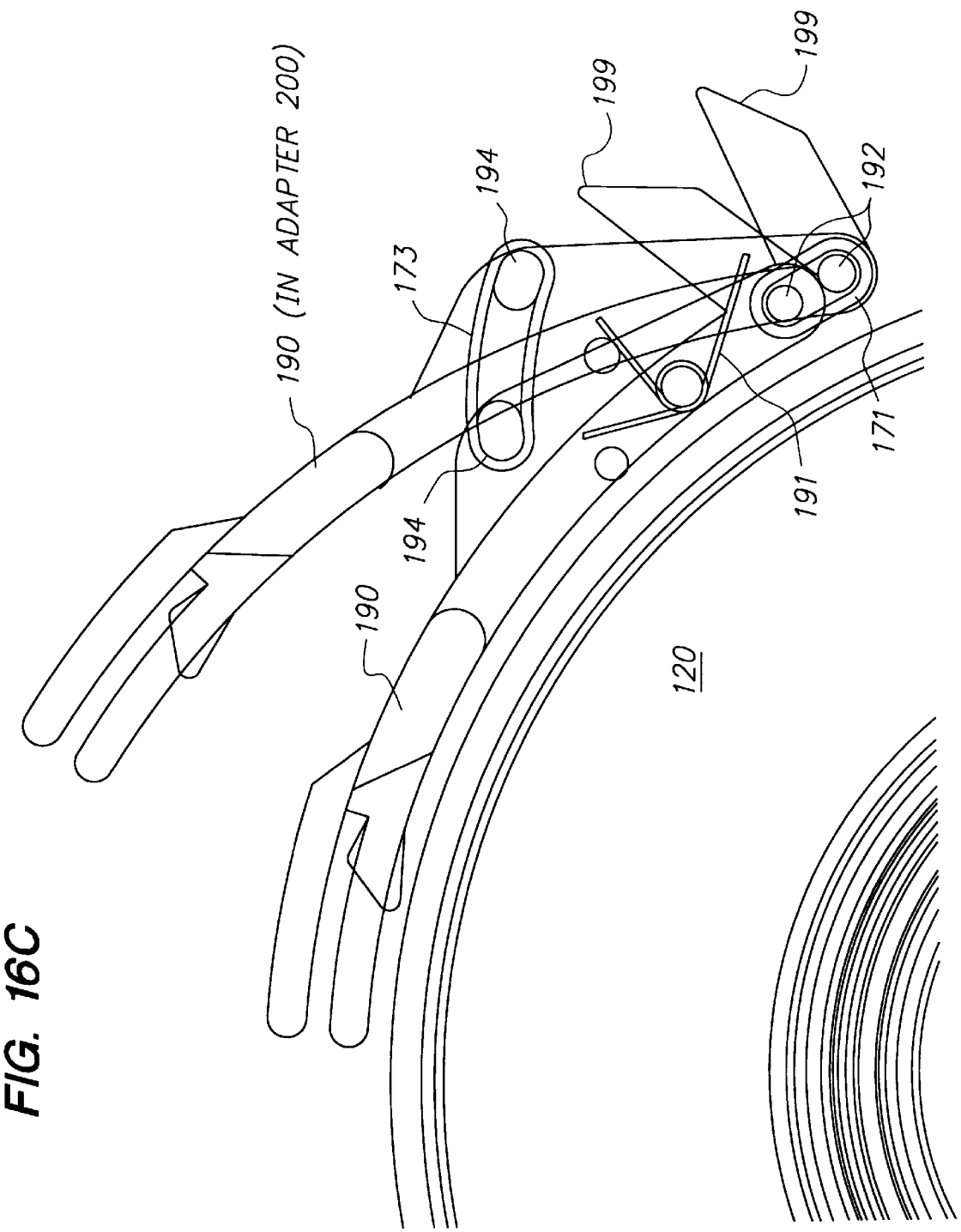

TWO-PART TAPE CARTRIDGE REEL LOCKING MECHANISM

FIELD OF THE INVENTION

The present invention relates to data storage media cartridges and cartridge adapters which are compatible with each other and with a standardized full size media cartridge. The present invention describes a reel lock mechanism in a tape cartridge and an adapter for holding a smaller tape cartridge in a housing such that the smaller cartridge may be used in a tape drive which accepts a larger, industry standardized tape cartridge.

BACKGROUND OF THE INVENTION

Cartridge tape drives are extensively used for archival backup of computerized user digital information, and are increasingly used as an information library tool, particularly on the so-called "world-wide web" or "internet". The information is typically written onto the tape as a linear track (or tracks) of magnetic flux transitions as the tape is drawn or "streamed" past a write head element. Typically, blocks of tape are successively streamed to the tape as it moves at high speed from a "beginning of tape" or "BOT" indicator, to an "end-of-tape" or "EOT" indicator. Alternatively, the digital information may be written in transverse tracks as the tape is drawn past a helical scan, rotating head array of the type employed in video cassette recording technology.

Since magnetic recording tape is a very thin, flexible plastic strip coated on one side with a magnetic storage material, it is susceptible to damage. The tape may become stretched or warped, and its edges may become damaged or frayed. Accordingly, tape cartridges have been developed in order to minimize physical damage to the tape during loading and unloading of the tape onto the tape drive. There are two basic types of tape cartridge: the self-contained feed and take-up reel cartridge, and the single, feed reel cartridge which includes a coupling or buckling mechanism at a leader end of the tape supply coiled on the single cartridge.

In order to achieve commercial success, it has been necessary for the industry to standardize tape cartridges and tape within the cartridges, so that cartridges following a particular standard may be received and used by tape drives designed to handle the standard cartridge design. Standardization has imposed a second and even more severe design restraint, and that is that newer tape cartridge designs should be backward-compatible with older tape drives (and newer tape drives should likewise be backward-compatible with older tape cartridges), in order to maintain the agreed-to cartridge standards. The present invention provides an improvement to a standardized cartridge design for a single-reel tape cartridge presently marketed by the assignee of this application under the DLT™ Compactape™ brand. This cartridge is standardized e.g. by American National Standards Institute standard ANSI X3.197-1991 standard entitled "Unrecorded Magnetic Tape and Cartridge for Information Interchange—½ inch (12.65 mm), Serial Serpentine, 22-Track, 6 667 ftpi (262 ftpmm) and 48-Track, 10 000 ftpi (394 ftpmm)". This industry standard cartridge specification is incorporated by reference herein as relevant background material.

The standardized cartridge 10 (shown diagrammatically in FIG. 1 and in greater structural detail in FIGS. 2 and 3) is a two-part, generally rectangular box structure containing a single feed reel 16 of tape with five rigid walls and at least a portion of a sixth wall having a door or shutter 34 which opens as the cartridge 10 is inserted into a compatible tape drive in order to enable tape drive access to a coupling end of a tape supply coiled on the reel 16. The cartridge 10 includes e.g. two defined openings 36 and 38 leading to two internal reel locks 30 and 32. The reel locks 30 and 32 are located to act on a diameter of the reel 16 and the locks prevent the feed reel from rotating and the tape pancake from unraveling during cartridge handling outside of the standard tape drive. A tape leader includes a buckling mechanism, and the cartridge 10 typically includes features to restrain the buckling mechanism at a defined position adjacent the opening.

A cartridge-handling portion 20 of the standard tape drive is shown functionally in FIG. 1. The compatible tape drive for the standardized cartridge 10 has a base casting (not shown) to which a molded-plastic cartridge receiver 50 is secured. As viewed from a front opening, the receiver 50 is adapted to receive a standard single reel tape cartridge 10. The receiver 50 is a generally U-shaped channel structure having a left side 52, a right side 54 and a top 56, and defines openings at front and back. A metal plate floor 58 has a spindle opening and is attached to the channel structure to form a box. A molded plastic drive cover (not shown in FIG. 1) attaches to the receiver and to a front wall of the base casting. The receiver 50 includes a front opening for receiving the cartridge, and provides journals for a rotatable handle mechanism 66 (shown diagrammatically in FIG. 1).

The handle mechanism 66 rotates two levers, a first one of which (not shown in FIG. 1) has a first finger which enters a standardized locating hole in the bottom of the cartridge when the handle is pushed flush with the front cover after the cartridge 10 is inserted. The other lever 66 has a second finger 68 which is also brought into engagement with the cartridge 10. While this second finger 68 may have a secondary locating function, a primary function of the second finger 68 is to release one of the feed reel locks within the cartridge 10.

Suspended between the two levers is a plate 70 with a slight rotational degree of freedom, and with a central opening. When the handle is in the open position, admitting the tape cartridge, the levers are pushed downwardly away from the receiver, and the plate engages a spring-loaded clutch mechanism on the feed reel motor fixed to the drive base. This action pushes the tape spindle assembly downwardly and out of the path of the cartridge 10. Conversely, when the handle mechanism is returned to its engaged, flush-against-the-front-panel position, the clutch plate 70 releases the spindle, and the plate 70 elevates the spindle into a nominal operating engagement with the single reel within the cartridge 10.

An annular toothed ring 72 of the spindle engages a complementary annular toothed plate of the feed reel within the cartridge. A feed reel motor 74 is directly coupled to rotate the drive ring 72 and thereby rotate the reel within the standard cartridge 10. A spring mechanism within the cartridge 10 provides a bias force to the feed reel, and this force is overcome when the spindle ring engages the feed reel toothed plate. Beveling of the ring and plate facilitate centering of the reel on the spindle when the spindle is engaged. One example of a tape cartridge including a spring-biased feed reel in accordance with the published standard is described in U.S. Pat. No. 5,027,249 to Johnson et al., entitled: "Tape Cartridge Bearing", the disclosure thereof being incorporated herein by reference.

A fixed cartridge door actuation structure 76 on the left sidewall 52 of the receiver 50 cooperates with a door opening structure 78 of the cartridge 10, so that as the cartridge 10 is pushed into the receiver 50 engagement of the fixed structure 76 with the cartridge door release structure 78 automatically opens the door 34 of the cartridge to expose the tape buckling mechanism. On the right sidewall of the receiver a solenoid-actuated, hinged locking dog 64 extends into a third standardized opening 42 defined in the cartridge 10. This third opening 42 comprises a notch in the right sidewall of the cartridge 10. Rotation of the locking dog 64 by the solenoid unlatches the handle mechanism 66 and allows the handle to be opened. Otherwise, once the cartridge 10 is loaded into the receiver 50 the cartridge locking dog 64 prevents the cartridge from coming out. The locking dog structure also carries a second micro switch which senses a user-activated write protect mechanism 44 which selectively opens and blocks a write protect window 46 formed in the sidewall of the cartridge adjacent the notch 42.

When the cartridge 10 is properly loaded into the receiver 50, the cartridge's right sidewall and opening 38 become precisely registered with reference datum planes of the receiver 50 and thereby with the feed reel spindle ring 72 of the tape drive. At the same time, the cartridge tape-protection features including the door and the two diametrically opposed reel locks become respectively opened and disengaged, thereby enabling the tape drive mechanism to buckle to the tape buckling mechanism and to draw the tape along a defined tape path within the drive, with tape tension controlled by the feed reel motor 74 as well as by a counter-torque applied by a take up reel motor to a take-up reel within the tape drive.

In the present example shown in FIGS. 2 and 3, the standardized cartridge 10 includes a two-part molded plastic housing including a top cover 12, and a bottom cover 14. The tape reel 16 is wound with a spool 18 of magnetic recording tape 18. The reel 16 may include only a top flange as shown in FIG. 3, or it may preferably include a top and a bottom flange. The flanges may provide a tape-wedging function be in accordance with the teachings of commonly assigned U.S. Pat. No. 5,474,253, entitled: "Wedged Reels in Streaming Tape Drives and Tape Cartridges", the disclosure thereof being incorporated herein by reference.

A center of rotation of the reel 16 is biased toward the bottom cover 14 and away from the top cover 12 by a coiled spring 21. A spring-loaded hub structure 22 engages a ball bearing assembly 24, the outer races of which engage a cylindrical flange of the plastic reel 16. Reel engagement teeth formed as an annulus 26 about the center of rotation of the reel 16 enable the reel to be rotated by the spindle ring 72 and spindle motor 74, once the cartridge 10 is loaded into the receiver mechanism 20 of a compatible tape drive 50. One reel flange of the reel 16 has outer peripheral teeth 28 which are engaged by toothed pawls of reel locks 30 and 32. The reel locks 30 and 32 are spring biased toward the reel periphery to lock the reel in place.

The cartridge 10 includes the hinged door 34 which is automatically opened by the structural features 76 of the compatible receiver 20 as the cartridge 10 is received therein, so that a buckle 35 of a tape leader of the tape 18 becomes exposed and thereupon may be engaged by an automatic tape buckling mechanism for bucking a drive leader to the tape leader. A suitable two-part tape buckling mechanism is shown in commonly assigned U.S. Pat. No. 4,572,460 to Hertrich, entitled: "Means for Pulling Tape From a Reel". Engagement and disengagement of the two parts of the tape buckling mechanism within the standard drive is more particularly described in commonly assigned, copending U.S. patent application Ser. No. 08/666,854 filed on Jun. 19, 1996, and entitled: "Improved Tape Buckling Mechanism for Single Reel Cartridge Tape Recording", now U.S. Pat. No. 5,769,346, the disclosure thereof being incorporated herein by reference.

The industry-standard cartridge 10 is provided with several cartridge-locating features, including an end wall slot 36, two bottom wall slots 38 and 40, and a side recess 42. In addition, a write-protect mechanism 44 alternatively blocks and exposes a window 46 in the sidewall of the cartridge 10. End wall slot 36 provides access for releasing reel lock 30, while bottom wall slot 38 provides access for releasing reel lock 32.

With reference again to FIG. 1, the receiver mechanism 52 includes a reference side wall 54, top wall 56, bottom wall 58 and end wall 60. These surfaces serve as datum planes to locate the cartridge 10 within the receiver 50. The end wall 60 includes a fixed pin 62 which passes through end wall slot 36 and engages reel lock 30, thereby rotating it away from the toothed periphery 28 of reel 16. A spring-biased latching pawl 64 includes a toothed portion which enters the side recess 42 and thereby locks the cartridge 10 inside of the receiver. A rotational latch mechanism 66 includes a locating/release pin 68 which passes through end wall opening 38 to release the other reel lock 32. A registration pin (not shown) may be provided as part of the rotational latch mechanism for entering the other end wall opening 40 and further register the cartridge 10 within the receiver. Accurate registration is needed to ensure that the toothed engagement ring 26 will precisely center with, and be engaged by, a reel motor drive mechanism. In addition, accurate registration is also needed to ensure accurate mating between a take up leader nose and a supply leader hoop.

The described combination of standard tape cartridge 10 and standard tape drive 50 has worked well for many years, with one principal drawback that the "form factor" of the cartridge and the "form factor" of the tape drive have remained substantially invariant over the years. This combination has occupied either a full-height 5.25 inch drive bay or a half-height 5.25 inch drive bay of a computer. A recent trend has been to provide disk and tape drives in smaller "form factors". One prevalent form factor is the so-called 3.5 inch form factor, because many computer designers specify, and computer cabinets provide, 3.5 inch drive bays, rather than 5.25 inch drive bays.

The need to reduce tape drive form factor to serve physically smaller computing systems has been recognized. A similar trend has been experienced in the hard (non-removable) disk drive art, and in the optical disk art. For removable media drives, particularly those performing backup or archival data storage service, backward compatibility becomes a critical and limiting condition. Cartridge adapters have been proposed for adapting smaller media units for compatible handling by larger media drives.

One example is the ubiquitous VHS-C cartridge used in many hand held video cassette recorder products and the surprisingly complex VHS-C adapter unit which adapts the small VHS tape video camera cartridge to a standard-size VHS cartridge and VCR playback unit. In at least one form, the VHS-C cartridge adapter carries a dry cell and includes a battery-operated DC motor for loading and unloading the VHS-C cartridge within the adapter before it is able to be handled within a conventional set-top VHS video recording/playback device. While this cartridge adapter is widely used, it is also quite complicated, and relatively expensive.

Another example is provided in U.S. Pat. No. 5,402,954, entitled "Videotape Adapter for Use With A Cartridge", and U.S. Pat. No. 5,082,196, entitled: "Video Cartridge Adapter Interlock System". A further example of a cartridge adapter is described in U.S. Pat. No. 5,331,627, entitled: "Cartridge Adapter". The '627 patent describes an optical disk cartridge adapter for holding a 90 mm optical disk cartridge within a drive adapted to receive a 130 mm optical disk cartridge. A "pseudo-spindle" was provided to interconnect the drive spindle with the smaller disk spindle opening. In addition, a rotating permanent magnet was provided directly above a shutter opening of the smaller cartridge in order to present a bias field to enable writing of the 90 mm magneto-optical media in the smaller cartridge.

Each of these prior, vastly different, cartridge approaches suggests that providing a workable miniaturized cartridge and a compatible cartridge adapter can be a daunting engineering challenge. This challenge is largely dependent upon the particular characteristics and requirements of the standard cartridge to which the miniaturized cartridge of different design will be adapted for handling by a drive or cartridge loader designed to handle the larger-sized standard cartridge. As a standard cartridge becomes imbued with many unique features for locating, reel-locking and releasing, write protecting, etc., the difficulty in adapting the defined standard for compatible use with a smaller form-factor cartridge becomes manifestly complex.

Thus, a hitherto unsolved need has remained for a form-factor-reduced single reel tape mini-cartridge and cartridge adapter enabling a standard form-factor tape drive to handle and access tape stored in the mini-cartridge.

SUMMARY OF THE INVENTION WITH OBJECTS

A general object of the present invention is to provide a tape mini-cartridge having standardized features and a mini-cartridge adapter for adapting the standardized features of the mini-cartridge to be functionally interchangeable with a larger form factor industry standard tape cartridge in a manner overcoming limitations and drawbacks of the prior art.

Another general object is to provide a tape cartridge adapter for transferring a plurality of functional forces applied by force imparting elements to features of a standard tape cartridge to structurally and functionally equivalent features of a mini-cartridge which is smaller than the standard tape cartridge and which is carried in the cartridge adapter.

A further object is to provide a size-reduced single reel tape cartridge with functional features and structural characteristics such that, with the aid of a tape cartridge adapter, the size-reduced tape cartridge achieves functional interchangeability with a larger industry standard tape cartridge within a tape drive mechanism.

One more object of the present invention is to provide a size-reduced single reel tape cartridge with a spindle hub having a spindle engagement portion sized and positioned to be compatible with a hub spindle engagement portion of a larger standardized tape cartridge such that a standard tape drive handling the larger standardized tape cartridge may be used with the size-reduced tape cartridge when carried within a compatible cartridge adapter.

Yet another object of the present invention is to provide a single reel tape cartridge with a reel locking mechanism overcoming limitations and drawbacks of the prior art.

A further object of the present invention is to provide a single reel tape cartridge with an improved spring bias force mechanism for biasing the reel into a locking engagement with a cartridge housing when the reel is not engaged by a tape drive spindle.

One more object of the present invention is to provide a size-reduced single reel tape cartridge with a pivoting tape leader guide for presenting a tape buckle in two operative engagement positions, one position being for engagement by a buckler when the size-reduced tape cartridge is loaded into a size-reduced tape drive, and the other position being for engagement by a buckler when the size-reduced tape cartridge while being carried within a cartridge adapter is loaded into a full size standard tape drive.

Accordingly, in one aspect of the present invention a tape mini-cartridge adapter is provided for adapting a tape mini-cartridge to a larger industry standard tape cartridge standardized appearance. The standard cartridge is of a single-reel type and has an internal reel and a standard dimension toothed hub for engagement by a toothed spindle ring of a standard tape drive. The tape mini-cartridge includes a cartridge housing containing a tape reel within the housing wound with a supply of standard dimension tape. The mini-cartridge housing includes a generally annular plateau region extending outwardly from a major face of the mini-cartridge housing and a standard-dimension toothed hub is exposed through and is substantially co-planar with the generally annular plateau region. The mini-cartridge adapter has an adapter housing for receiving the mini-cartridge therewithin. The adapter housing has a major wall surface which defines a slot for receiving the plateau region in substantial coplanar alignment with the major surface such that the mini-cartridge and mini-cartridge adapter present the standard dimension toothed hub of the mini-cartridge reel to a standard tape drive at standardized position and elevation relative to the drive's feed reel spindle. Desirably, the mini-cartridge plateau region and the adapter include complementary keying features for restricting insertion of the mini-cartridge into the adapter in one intended engagement orientation.

In a related aspect of the present invention the tape mini-cartridge adapter adapts the mini-cartridge to standardized cartridge features for receiving mechanical force imparting elements of a tape drive. The force imparting elements are applied to the standard cartridge through standardized openings of the standard cartridge housing and come from a plurality of different directions. The tape mini-cartridge adapter includes a plurality of internal structural mechanisms which receive the force imparting elements through standardized openings in the adapter housing of the mini-cartridge adapter and transfer the forces to functionally equivalent structural elements of the mini-cartridge. The mechanisms may include a rocker arm member, and coupled link-pivot members for achieving the desired force translations from the standard tape drive to the mini-cartridge, so that the mini-cartridge may be handled by the conventional tape drive without any structural modification thereto.

In another related aspect of the present invention, the standard cartridge includes a standard tape leader and a buckle mechanism, and a fixed structure for restraining the buckle mechanism at a standard position relative to a front opening of the standard cartridge. In this aspect of the invention the mini-cartridge has an internal reel and a pivoting leader buckle guide member for engaging and restraining the leader buckle. The guide member normally presents the buckle at a first position adjacent a front opening of the mini-cartridge, but is displaceable to present the buckle at the standard tape cartridge position relative to a front opening of the standard cartridge in a manner avoiding stretching or breaking a tape leader. The mini-cartridge adapter includes a spring loaded pawl for causing the leader buckle guide member to displace from the first position to present the buckle at the standard position when the mini-cartridge is inserted into the mini-cartridge adapter.

In one more related aspect of the present invention a tape cartridge has a box-shaped housing with at least two major walls. A tape reel within the housing contains a supply of coiled recording tape. The reel has at least one flange located adjacent to one major wall. A toothed spindle ring is sized and positioned to be engaged by a standardized spindle ring of a tape drive. The one major housing wall defines a generally annular plateau region adjacent an opening for receiving the toothed spindle ring generally flush therewith. A spring bias mechanism applies a force from the other major wall to urge the reel toward the one wall. A pair of adjacently-facing rings of locking teeth are formed on an inner surface of the annular plateau region and on an adjacently facing surface of the flange adjacent the toothed spindle ring. The spring force urges the teeth of the reel into locking engagement with the teeth of the plateau region to lock the reel. A tape drive spindle engages the toothed spindle ring and following release of a reel flange locking member, the spindle displaces the reel to clear the pair of respective locking teeth, thereby enabling the reel to be rotated freely within the housing during tape drive operations.

In yet another aspect of the present invention, an improved reel preload arrangement is provided for a tape media cartridge. In this aspect the tape media cartridge includes a generally box-shaped housing with at least two major walls. A single reel contains a coil of recording tape thereon, the reel being formed of a plastic material and it defines a bearing dimple having a contact point aligned with an axis of rotation of the reel. A plunger is formed of plastic material and has a flat face portion facing the bearing dimple. A coil compression spring bears between one of the two major walls and the plunger and thereby transfers a bias force to the reel through the plunger at the contact point. This arrangement enables a plastic-on-plastic bearing arrangement with minimized wear, and thereby reduces the cost of the media cartridge.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

In the Drawings:

FIGS. 16A, 16B, and 16C are respective views of a leader buckle, a pivoting leader guide, and the two operating positions of the leader guide within the FIG. 5 mini-cartridge in accordance with aspects of the present invention. FIG. 16A is an enlarged view of a tape guide leader buckle engaged by the FIG. 16B leader guide. FIG. 16B presents an enlarged isometric view of the pivoting leader guide itself. And, FIG. 16C presents an enlarge diagrammatic plan view of the leader guide in a normal position, and in an extended position when the FIG. 5 mini-cartridge is within the cartridge adapter, in accordance with aspects of the present invention.

DETAILED DESCRIPTION OF PREFERRED EMBODIMENTS

Figure 4A:
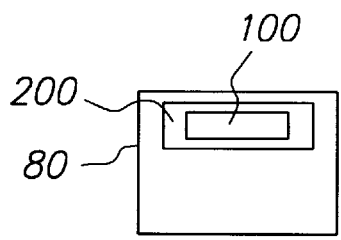
FIG. 4A is a diagrammatic front view of a conventional tape drive for receiving and using the FIG. 1 industry-standard tape cartridge, and a mini-cartridge and adapter in accordance with principles of the present invention.

In accordance with principles and aspects of the present invention, and as one example of a preferred embodiment, a tape mini-cartridge 100 and a mini-cartridge adapter 200 may be physically combined in a nested relationship to provide functional compatibility in place of a larger, industry standardized tape cartridge 10 described above. In the FIG. 4A diagram, the mini-cartridge 100 and adapter 200 are inserted as a combined unit into a receiver 50 of a conventional tape drive, such as the drive 80 shown in FIG. 4A. The conventional tape drive 80 follows an established form factor of a full height or half height 5.25 inch drive and fits into a drive bay of a computer or storage array housing dimensioned to receive this particular drive form factor.

Figure 4B:
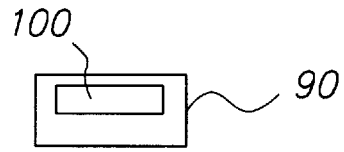
FIG. 4B is a diagrammatic front view of a mini-cartridge tape drive for receiving and using the FIG. 4A mini-cartridge without the adapter, in accordance with principles of the present invention.

Alternatively and equally satisfactorily, the mini-cartridge 100 may be used within a tape drive specifically adapted to receive and handle the smaller tape cartridge 100. FIG. 4B shows a small form factor tape drive 90 which receives and handles the mini-cartridge 100 directly, without need or requirement for the adapter 200. Of course, the smaller tape drive 90 cannot receive or handle the conventional, full size cartridge 10.

Information may be recorded on the tape within the mini-cartridge 100 on either the larger drive 80 or the smaller drive 90, and played back on a drive of the other size, it being understood that the larger drive 80 requires the mini-cartridge 100 to be installed within the cartridge adapter 200. Further, in order for the mini-cartridge 100 to be used on the standard drive 80, it is necessary that the cartridge adapter 200 present the same structural and functional appearance to the standard drive 80 as would the conventional cartridge 10. Since the conventional cartridge 10 has a plurality of structural elements engaged by the standard drive 80, it is necessary for the cartridge adapter 200 to transfer effectively those engagements and forces to the mini-cartridge in a manner providing compatible functionality. Just how this daunting task is accomplished is explained hereinafter, first by considering the structural details of the mini-cartridge 100, and then by considering the structural and functional details of the cartridge adapter 200.

Mini-cartridge 100

Figure 5:
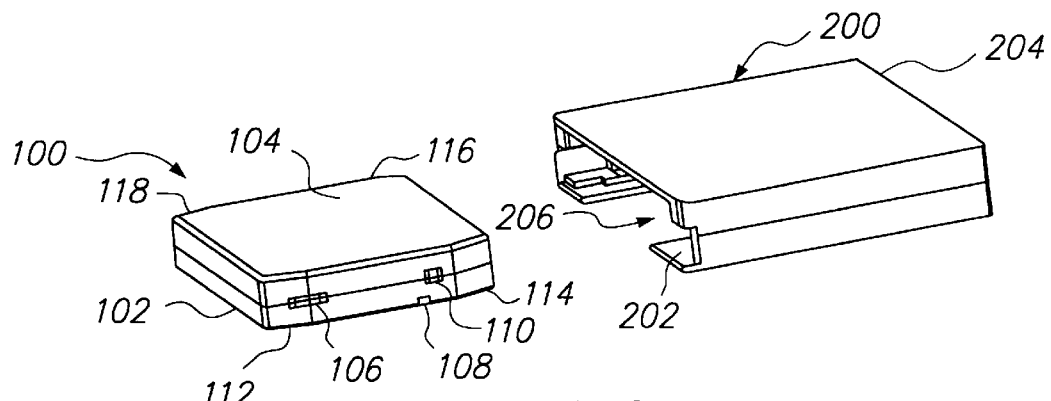
FIG. 5 illustrates a mini-cartridge and an adapter for receiving and adapting the mini-cartridge to a size compatible with the conventional single-reel cartridge described above, the mini-cartridge and adapter being in accordance with principles of the present invention.

In FIG. 5 the mini-cartridge 100 is seen to include e.g. a molded plastic lower shell 102 to which e.g. a molded plastic upper shell 104 is secured e.g. by threaded screws or ultrasonic welding. While molded plastic is presently preferred to form the two-shell housing, other materials, such as die-stamped sheet metal, may be used. The mini-cartridge 100 includes a single reel 120 upon which a supply of e.g. ½ inch magnetic recording tape 121 is spooled, to form a tape "pancake". An inner end of the tape 121 is secured to a reel hub 122. The reel 120 includes a lower reel flange 130 which is preferably formed integrally with the reel 120, and may include a top flange 131 which is typically formed as a separate disk and secured to the reel hub 123 by e.g. a suitable adhesive or plastic solvent.

Figure 7:
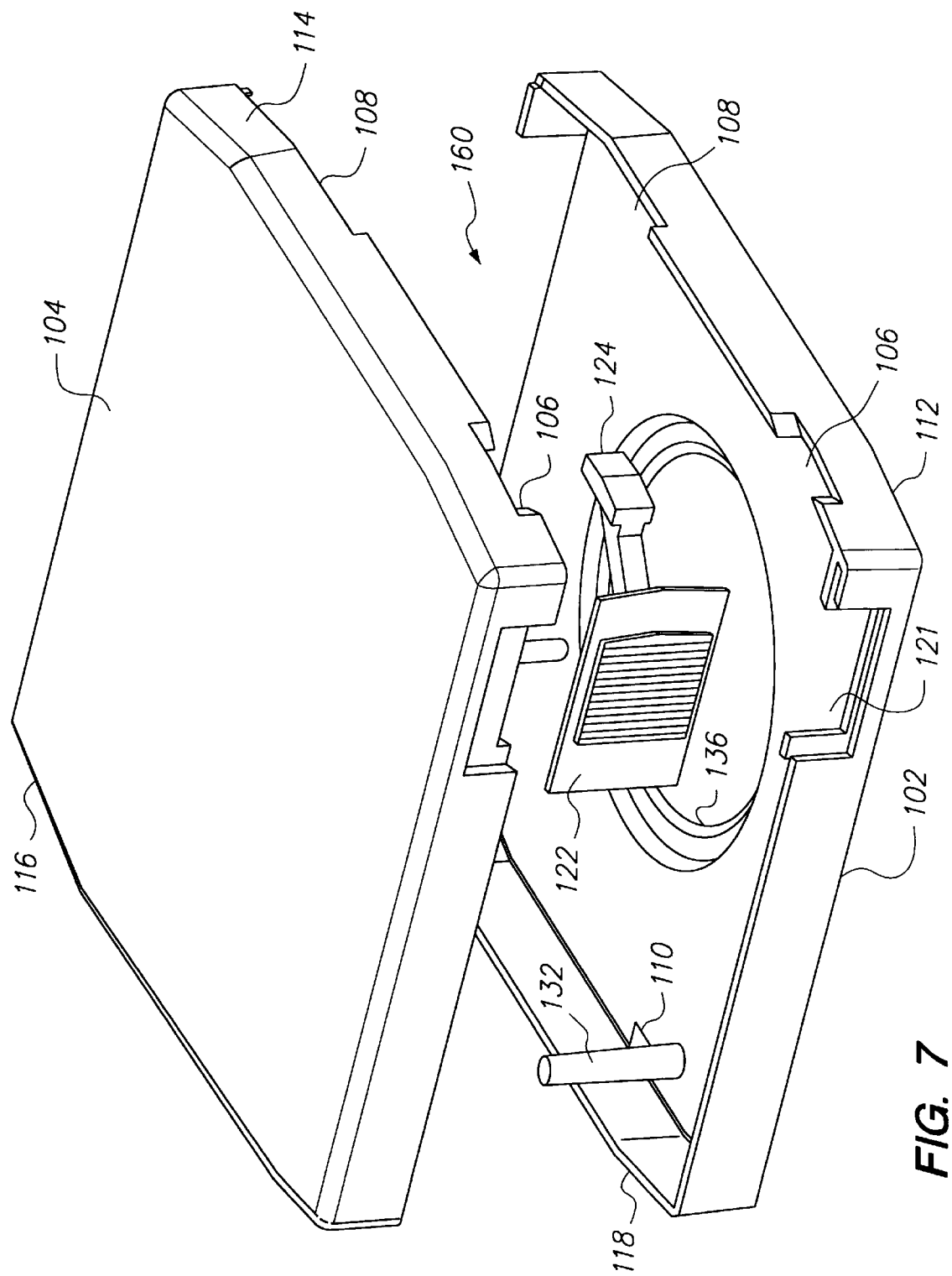
FIG. 7 is an enlarged, exploded isometric view of the FIG. 5 mini-cartridge housing, illustrating a write-protect feature.

As shown in FIG. 7, the mini-cartridge two-piece 102, 104 housing defines a series of functional openings. A first right side window opening 106 exposes a write-protect flag 124. A second right side window opening 108 is provided to admit a pawl 240 of the cartridge adapter 200 for rotating a tape leader guide 190 from a retracted position to an extended position. An opening 110 on the left side of the mini-cartridge 100 receives a finger for releasing a spring-biased reel lock mechanism 126. An opening 121 in the rear side-wall and related structure receives a write-protect slide mechanism 122 including the write protect flag 124 which alternatively blocks and unblocks the write-protect window 106, depending upon the setting of the operator-actuated write-protect slide mechanism 122. An elongated front opening 160 enables access to the tape and tape buckling mechanism held by a leader guide 190. A door 162 hinged to the housing covers the opening 160 when the mini-cartridge 100 is located or being handled outside of a tape drive cartridge receiver or a cartridge adapter 200 in order fully to enclose and thereby protect the tape pancake 121.

The two-part housing 102, 104 of the mini-cartridge 100 is attractively shaped by providing beveled side wall segments 112, 114, 116 and 118, as shown in FIG. 7. The beveled surfaces 112–118 functionally guide the mini-cartridge 100 into a cartridge receiver of the smaller tape drive 90, or into the cartridge adapter 200. The cartridge adapter 200 includes guiding and centering walls, e.g. wall 206, which are contacted by the beveled forward wall segments 114, 116 of the mini-cartridge 100.

Figure 8A:
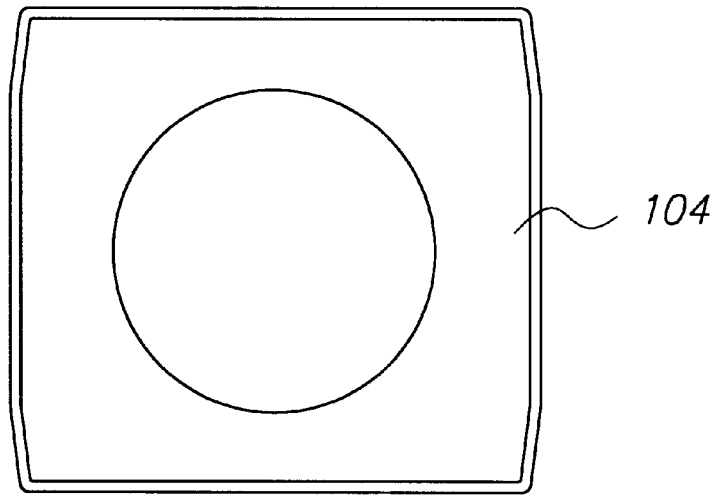
FIGS. 8A, 8B and 8C are respectively top plan, side elevation, and bottom plan views of the FIG. 5 two-piece mini-cartridge exterior housing.
Figure 8B:
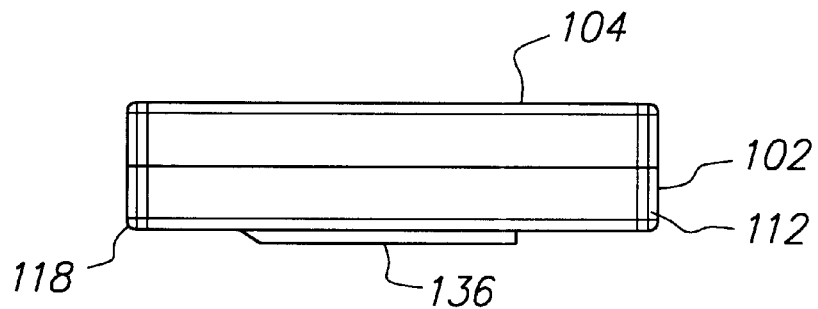
Figure 8C:
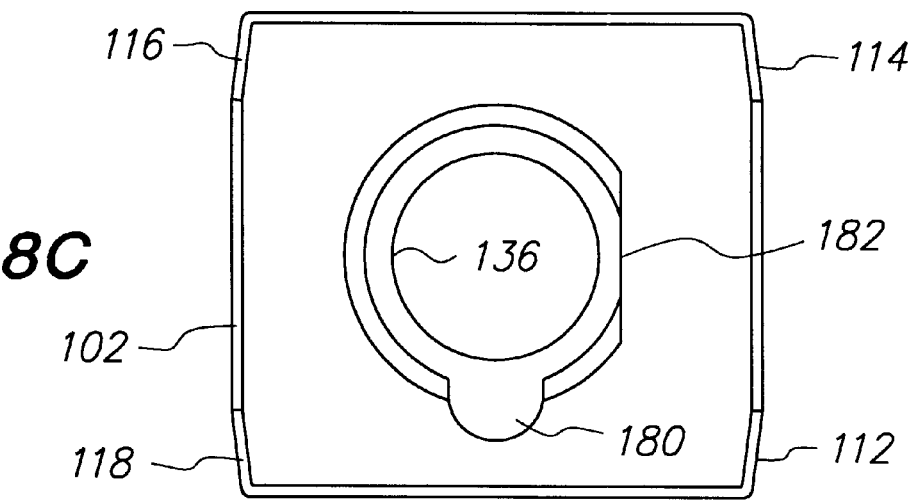

As shown in FIGS. 8A, 8B and 8C a central annular ring 136 which extends outwardly from the lower shell 102 includes two unique keying features 180 and 182. Tab 180 serves as a centering feature, whereas notched edge feature 182 ensures that the mini-cartridge 100 can be received by a compatible receiver, such as the adapter 200 or the small tape drive 90 in one orientation/insertion direction only.

As shown in FIG. 7, the mini-cartridge lower shell 102 includes a molded vertical journal post 132. The post 132 receives the molded plastic reel lock 126. As shown in FIGS.

Figure 12:
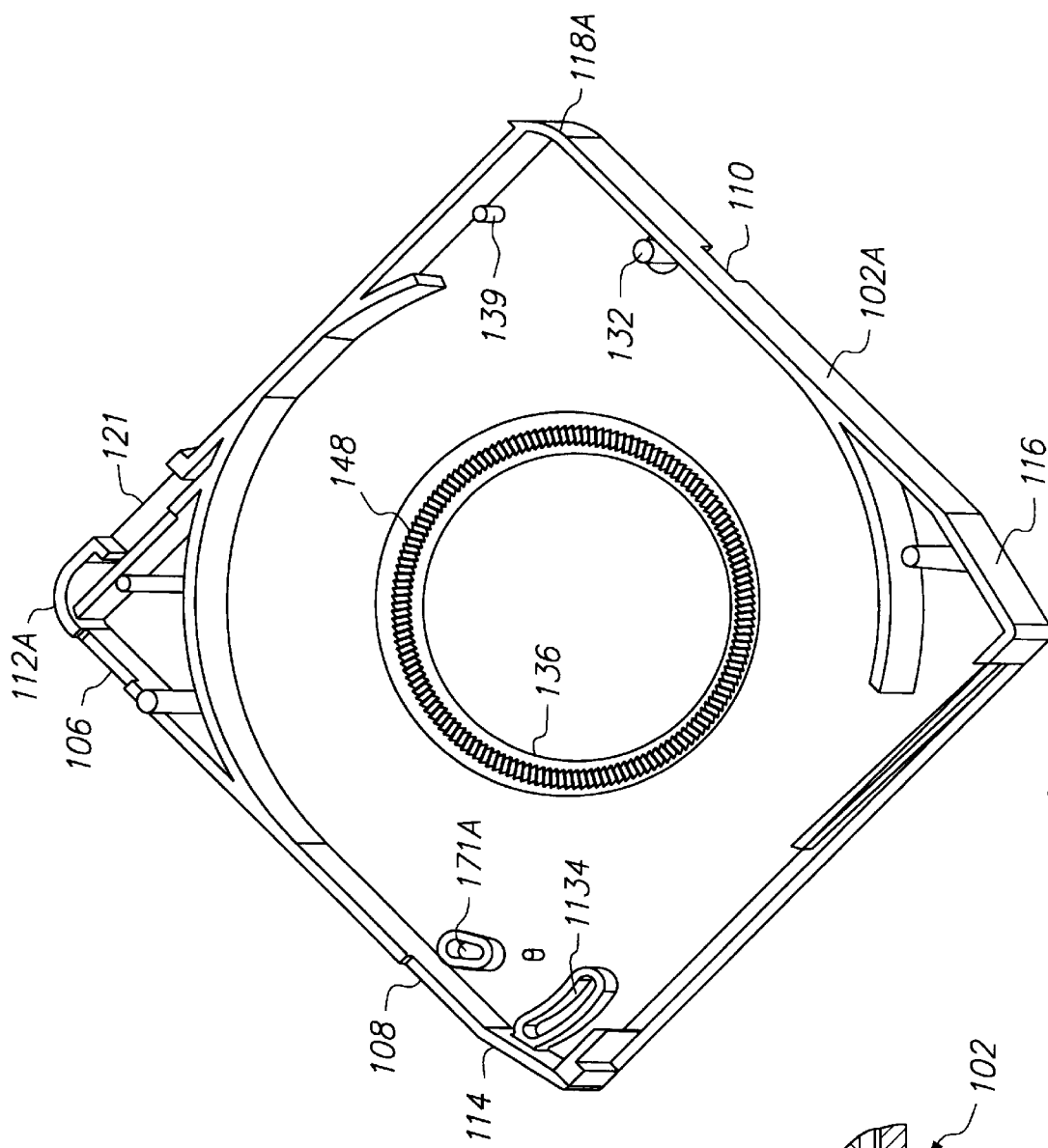
FIG. 12 is an isometric view of an interior of the bottom shell of the FIG. 5 mini-cartridge.

6, 7, 9 and 9A, a first preferred embodiment of the mini-cartridge reel lock 126 includes a hub portion 142 which has a transverse cylindrical opening for receiving the journal post 132. A somewhat curved portion 140 extends from the hub 142 in a first direction and ends at the locking dog end 141. Another portion 146 extends from the hub 142 in a different direction and ends at the flag portion 146. A generally triangular web portion 143 extends to a boss 144 which engages one end of coil spring 128. Another end of the coil spring 128 is secured to a boss 139 extending upwardly from a floor of bottom shell 102, as shown in FIG. 12, for example.

In this preferred embodiment, the locking dog end 141 of lock 126 is spring-biased by coil spring 128 toward, and normally engages, a notched outer peripheral edge 133 of lower reel flange 130 of the tape reel 120. A reel lock releasing force applied through the window 110 to a release flag portion 146 of the reel lock 126 overcomes the bias force applied by spring 128 and rotates the reel lock 126 about the post 132 to cause the lock dog portion 141 to move outwardly and away from locking engagement with the reel flange 130. This action releases the tape reel 120 from being locked against rotation relative to the cartridge housing. Following release, the reel 120 and its ring of locking teeth 147 may become axially displaced away from the ring of locking teeth 148 of the lower housing shell 102 by axial engagement and displacement of a spindle ring, such as spindle ring 72, of e.g. the conventional disk drive 80. Following axial displacement, the reel 120 becomes freely rotatable by the drive's feed reel spindle motor 74, for example. A similarly configured spindle ring mechanism and a spindle motor are included in the small form factor tape drive 90 of FIG. 4B.

Figure 10:
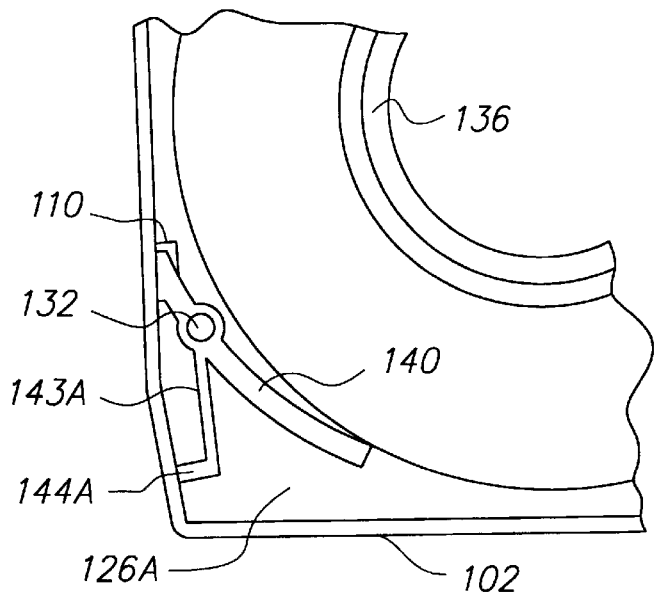
FIG. 10 is a plan view of a portion of the FIG. 5 mini-cartridge illustrating an alternative preferred embodiment of a reel lock having a live spring bias section in accordance with aspects of the present invention.
Figure 9A:
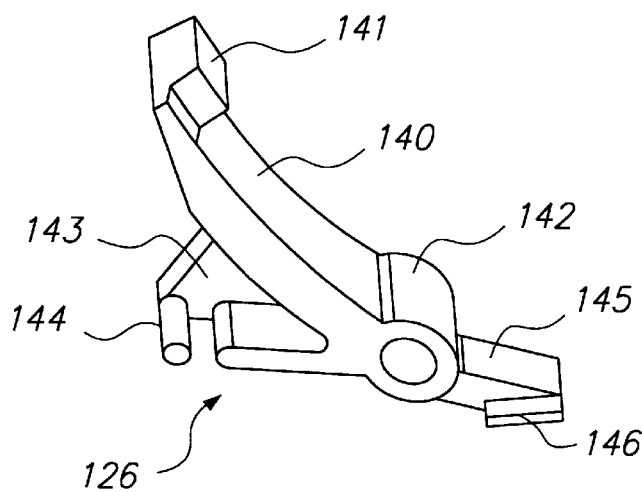
FIG. 9A is an enlarged bottom isometric view of the FIG. 9 reel lock.
Figure 10A:
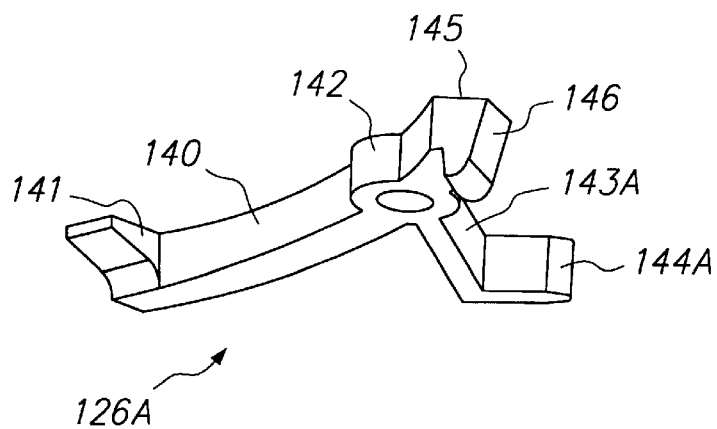
FIG. 10A is an enlarged bottom isometric view of the FIG. 10 reel lock.

FIGS. 10 and 10A illustrate an alternative preferred embodiment of reel lock 126A which is substantially interchangeable with the lock 126. In this alternative preferred embodiment, the reel lock 126A is also formed as a single unitary plastic molding, and it includes the slightly curved lever arm 140 terminating in the locking dog end 141 at a distal end. A hub 142 has a transverse cylindrical opening for receiving the journal post 132 at the other end of the lever arm 140. In this embodiment the metal coil spring 128 is replaced by a thin elongated live spring section 143A which is formed integrally with the other elements of the plastic reel lock structure 126A. The live spring section 143A extends from the hub 142 in a direction different from the arms 140 and 145 and has a suitable spring length, and includes a protrusion 144 for contacting e.g. the inside of angled side wall 114 of the lower shell 102 of the mini-cartridge 100, as shown in FIG. 10.

Figure 6:
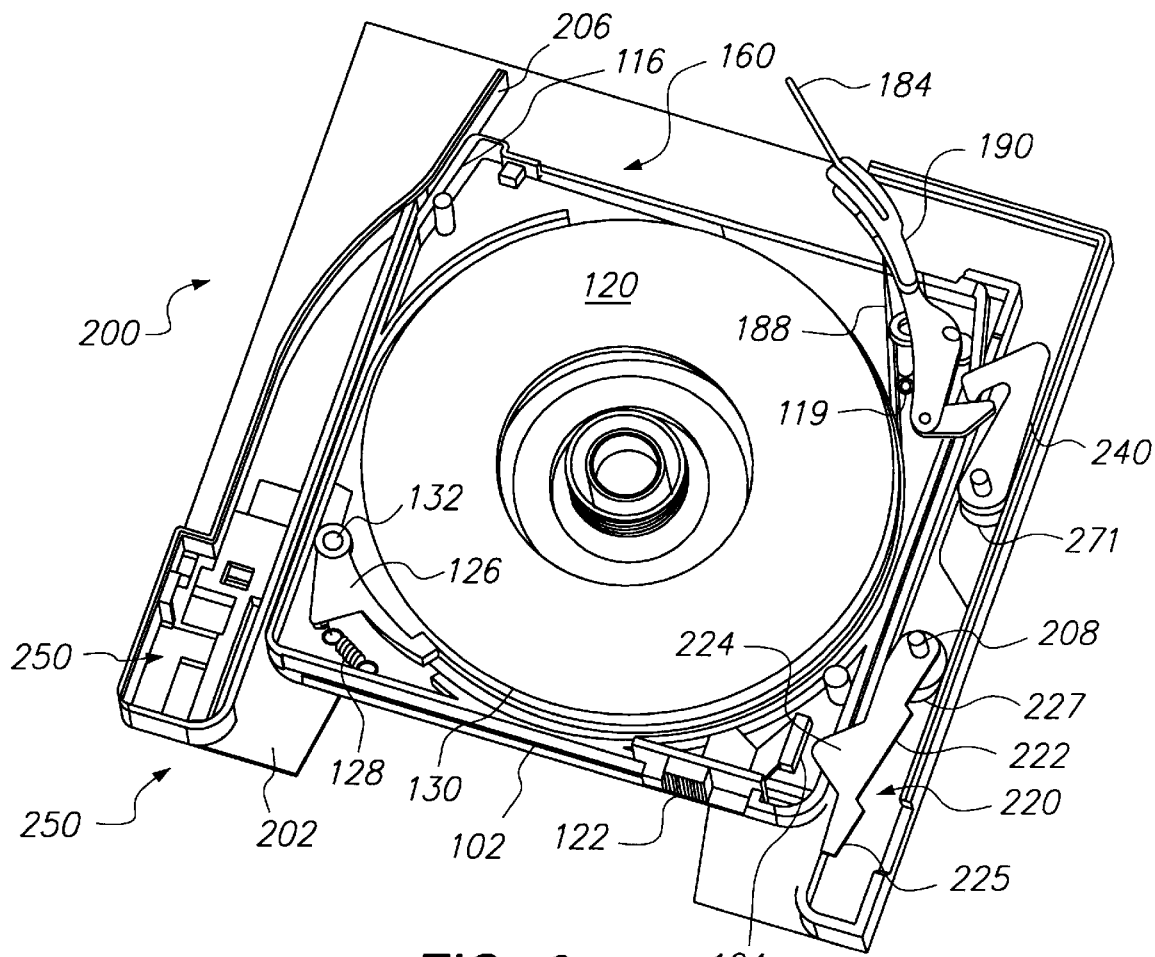
FIG. 6 is an isometric diagrammatic view of the FIG. 5 mini-cartridge and adapter shown in a fully engaged relationship, and with respective cover portions of the mini-cartridge and the adapter removed to facilitate illustration and understanding of the various components and elements thereof.

In order to work satisfactorily in both the large, conventional tape drive 80 and the smaller drive 90, the mini-cartridge 100 includes a springbiased, slidably pivoting leader guide 190 which engages and restrains a leader buckle 184. The leader guide 190 is shown in FIG. 6 in its extended position when the mini-cartridge 100 is seated and locked into the cartridge adapter 200, for example. The leader guide 190 is shown in its normally retracted position in the FIG. 9 view. When the mini-cartridge 100 is used in the smaller tape drive 90, the leader guide is rotationally biased toward the periphery of the tape reel 120, by a bias spring 191, as in a position shown in the FIG. 9 diagrammatic view. The leader guide 190 is explained in greater detail hereinafter.

Figure 1:
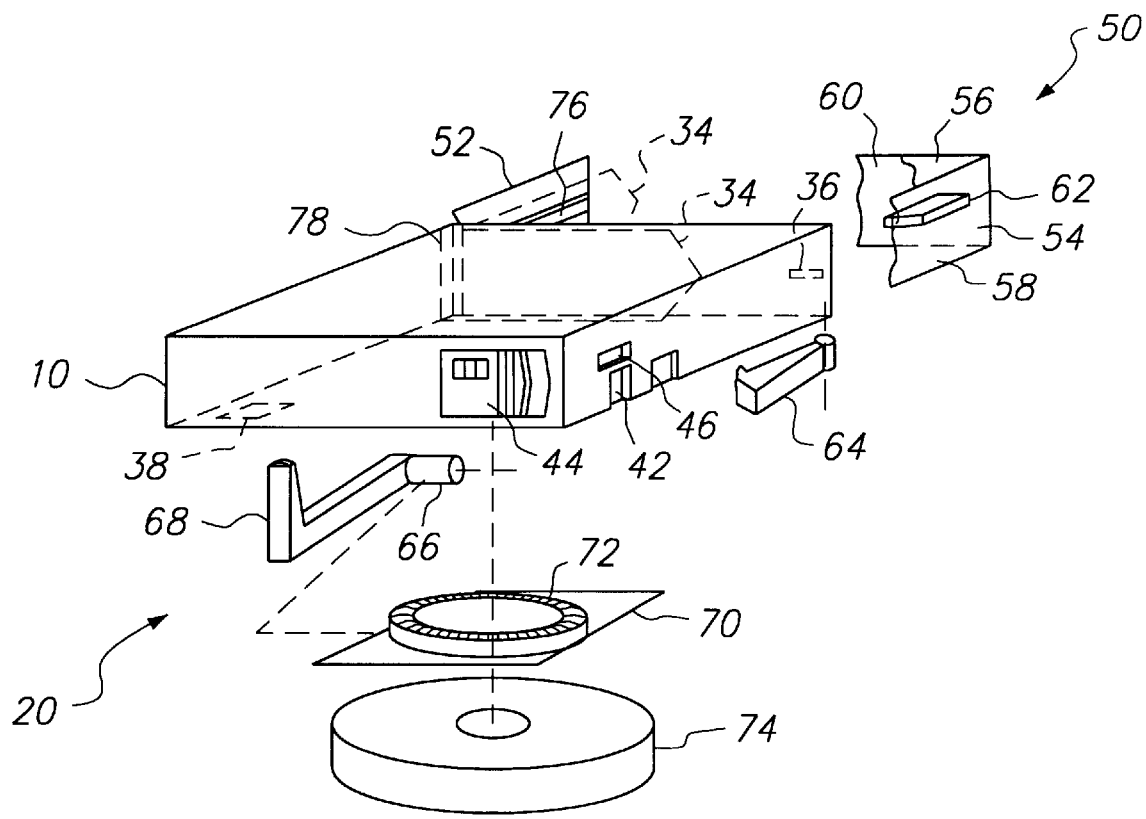
FIG. 1 is an exploded isometric view of an industry-standard tape cartridge and relevant functional portions of a tape receiver mechanism of a tape drive adapted to handle the standard cartridge.
Figure 11:
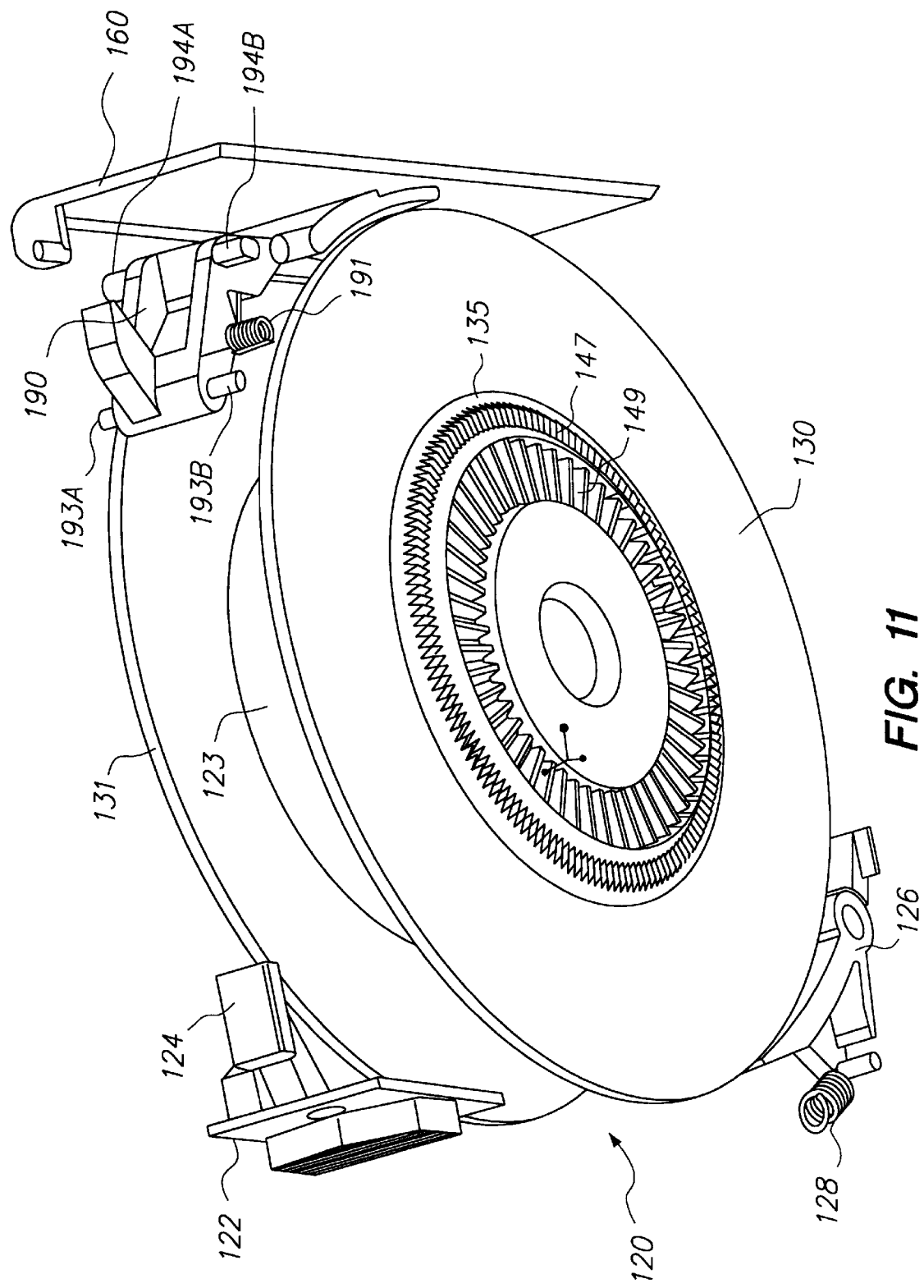
FIG. 11 is an enlarged, isometric, diagrammatic bottom view showing the tape reel with an outer annular region forming reel locking teeth and an inner annular region forming spindle engagement teeth, the reel lock, the write protect mechanism, and the leader guide and door of the FIG. 5 mini-cartridge in assembly position with respect to the two-piece housing (which has been removed in this view).

The reel lock 126 and lower flange 130 form one part of a two-part reel locking mechanism. The other part is formed by two mating teeth rings: a rotating reel flange teeth ring 147 formed on an annular plateau 135 of the reel lower flange 130 as shown in FIG. 11, and a ring of fixed teeth 148 formed on an upper wall of the housing annular flange 136 as shown in FIG. 12. The bottom of the lower flange 130 also defines an inner toothed spindle ring 149 having teeth sized and pitched to be engaged by a standard spindle ring, such as the spindle ring 72 of conventional drive 80 shown in FIGS. 1 and 4.

Figure 12A:
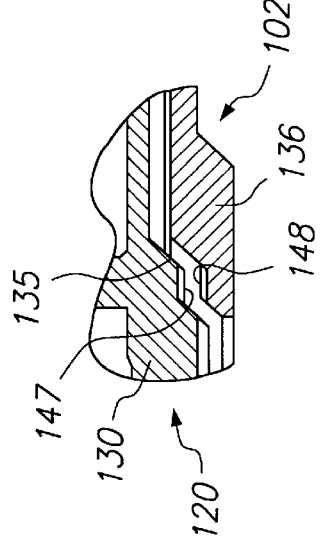
FIGS. 12A is a detail view in section and elevation showing meshing relationship of the locking teeth of the lower reel flange with the lower shell wall, in accordance with aspects of the present invention.

The rotating reel flange teeth ring 147 and the fixed complementary teeth ring 148 are normally meshed in a locking engagement by virtue of a reel preload bias force. The teeth rings 147 and 148 become released from mutual locking engagement by upward movement of the reel 120 relative to the base 102 after the reel lock 126 is retracted and the toothed spindle ring 149 is engaged by a mating standardized spindle ring, such as the conventional spindle ring 72 of drive 80 shown in FIGS. 1 and 4. Engagement by the spindle ring also involves moving the reel slightly upwardly to the clearance position as shown in FIG. 12A.

Figure 14:
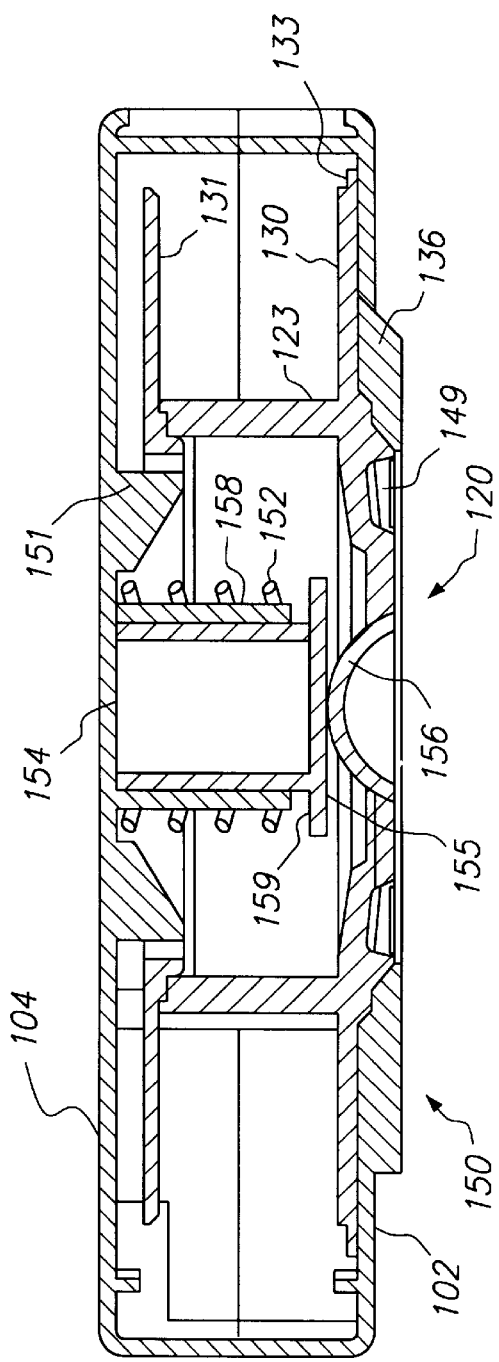
FIG. 14 is a view in side elevation and section of a spring-biased tape reel preload mechanism for biasing the tape reel of the FIG. 5 mini-cartridge toward the lower shell wall, thereby promoting meshing engagement of the oppositely facing reel locking teeth in accordance with aspects of the present invention.

An internal reel preload mechanism 150 implements a plastic-on-plastic bearing and applies a bias force between the upper shell 104 and the reel 120. As shown in FIG. 14, the preload mechanism 150 includes a helical coil spring 152 which transfers a force to a molded plastic cylindrical plunger 154. The plunger 154 includes a flat disk face 155 which faces an upwardly curving dimple bearing 156 formed in the plastic reel 120. A cylindrical chimney 158 is formed as part of the top shell 104. The plunger 154 is slideably seated inside of the chimney 158, while the coil spring 152 is mounted outwardly surrounding the chimney 158. A flange extension 159 of the plunger disk face 155 is engaged by a free end of the coil spring 152 while a fixed end of the spring 152 seats against an inside surface of the top shell 104 outwardly adjacent the chimney 158. A finned annular reinforcing structure 151 is formed as a part of the top shell 104 and surrounds the chimney 158.

The spring-loaded plunger 154 bears down upon the dimple bearing 156 of the plastic reel, in response to the preload force applied by the spring 152 between the top shell 104 and the plunger 154. The dimple bearing 156 is generally hemispherical and contacts the flat disk face 155 of the plunger such that when the reel is engaged by a spindle and rotating, a contact point of the dimple bearing 156 is always substantially aligned with a center of rotation of the reel 120 relative to the mini-cartridge housing and plunger 154 (shown as the dashed line in FIG. 14). Most preferably, the dimple bearing 156 and the plunger 154 are formed of wear resistant and/or lubricated plastic material. The dimple bearing 156 establishes a minimal-radius contact point with the flat surface 155 of the plunger in a manner resulting in minimal wear between these plastic elements at the contact point, and enables the contact point to move relatively along the flat disk face 155 in order to accommodate high volume manufacturing and usage tolerances. The dimple bearing 156 may be molded as an integral part of the reel 120, or it may be a separate part that is suitably secured in an opening molded into the reel 120. Similarly, the flat disk face 155 may be integrally molded within the plunger 154, or it may be a separate part to which the cylindrical plunger body is suitably bonded or secured.

Advantages of the preload mechanism 150 include the dimple bearing 156 being formed with the rotating mass, i.e. reel 120, while the flat surface 155 of the plunger 154 is formed with the non-rotating mass, i.e. the plunger. Specifically, locating the dimple on the rotating half of the bearing interface reduces the relative velocity of the wear surfaces with respect to each other when the two surfaces are in a misaligned condition. As a result, bearing wear is reduced. In addition, the flat surface 155 enables the dimple bearing surface to move laterally, relative thereto. This enables the preload force to remain normal to reel 120, thereby not inducing any lateral vector to lift one side of the reel hub off the reel driver. Consequently lateral tape movement (LTM) may be avoided.

Alternatively, the dimple bearing 156 may be replaced by a steel ball secured to the reel 120. All the functional aspects and advantages discussed herein above, with respect to the plastic dimple bearing 156, would similarly apply.

Figure 13:
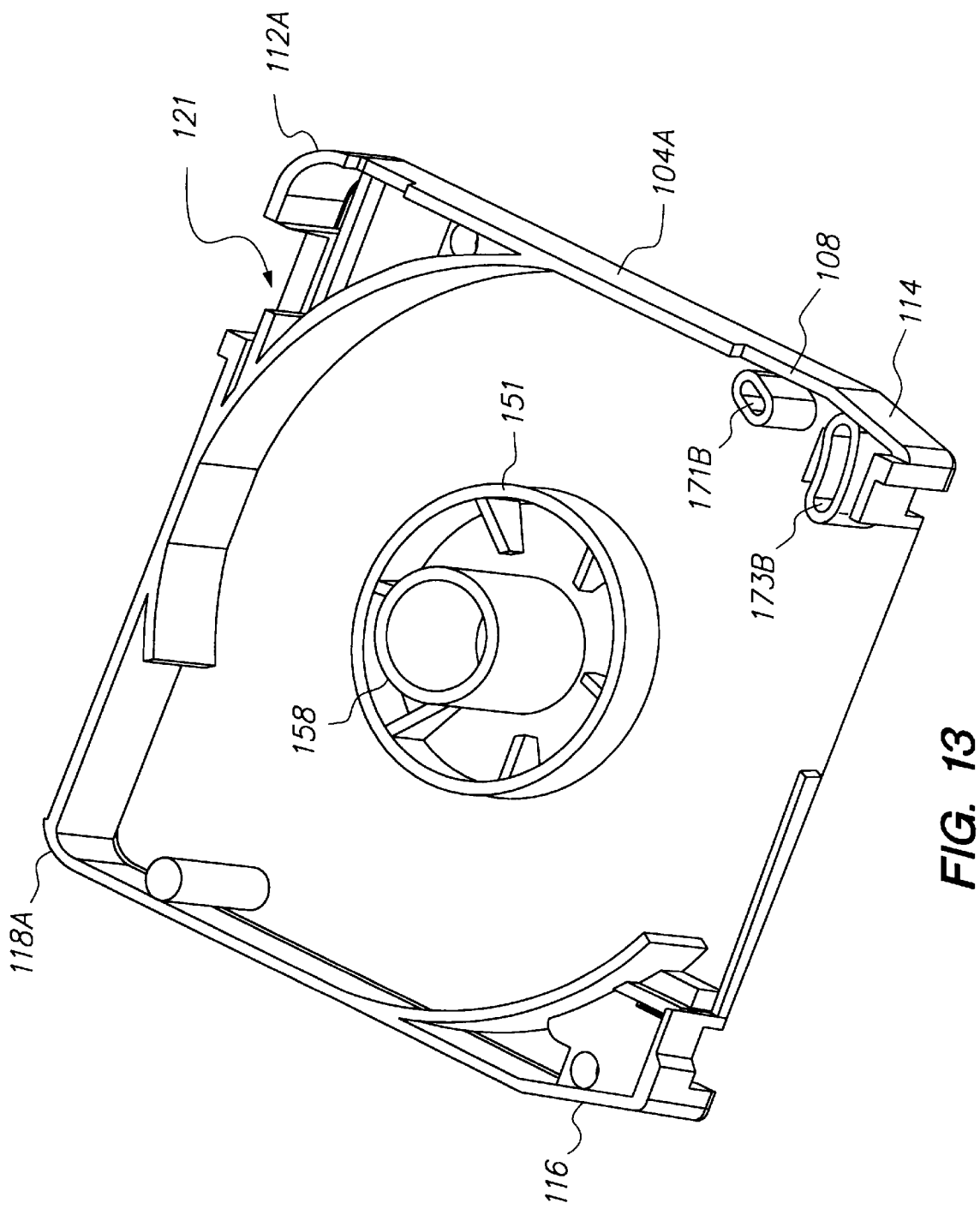
FIG. 13 is an isometric view of an interior of the top shell of the FIG. 5 mini-cartridge showing a central cylindrical chimney structure for supporting a tape reel preload mechanism.

The bottom shell 102A and top shell 104A shown in FIGS. 12 and 13 differ slightly from the shells 102 and 104 shown in FIG. 7. In the FIGS. 12 and 13 embodiment of the mini-cartridge housing, the beveled surfaces 112 and 118 have been changed to rounded corners 112A and 118A, respectively. The modified shells 12 and 13 provide a mini-cartridge housing which is less likely to be inserted into a cartridge receiver in an incorrect orientation.

Figure 9:
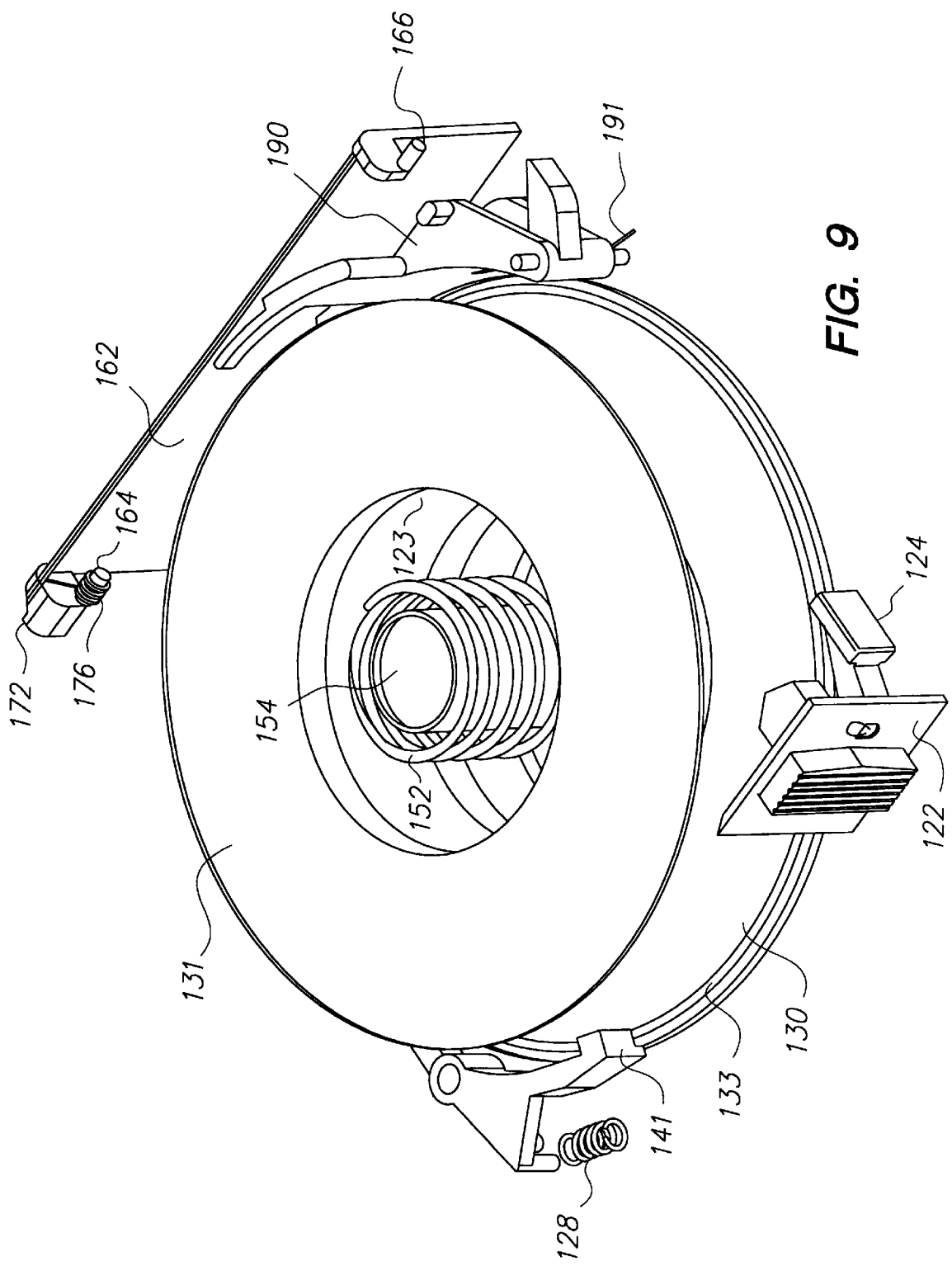
FIG. 9 is an enlarged, isometric, diagrammatic top view showing the reel lock, write protect mechanism, tape reel, leader guide and door of the FIG. 5 mini-cartridge in their respective positions with respect to the two-piece housing which has been removed in this view.
Figure 15A:
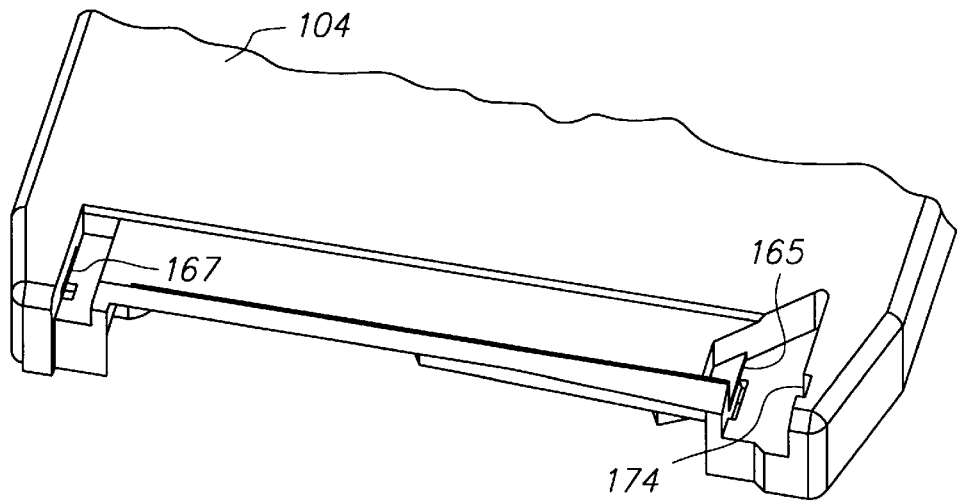
FIGS. 15A, 15B, and 15C are three views pertinent to an access door arrangement of the FIG. 5 mini-cartridge; the FIG. 15A isometric view showing door features of the top shell of the mini-cartridge housing; the FIG. 15B isometric view showing the door installed on the top shell and in a closed position; and, the 15C isometric view showing the door in an open, and rearwardly displaced position relative to the top shell of the mini-cartridge housing.
Figure 15B:
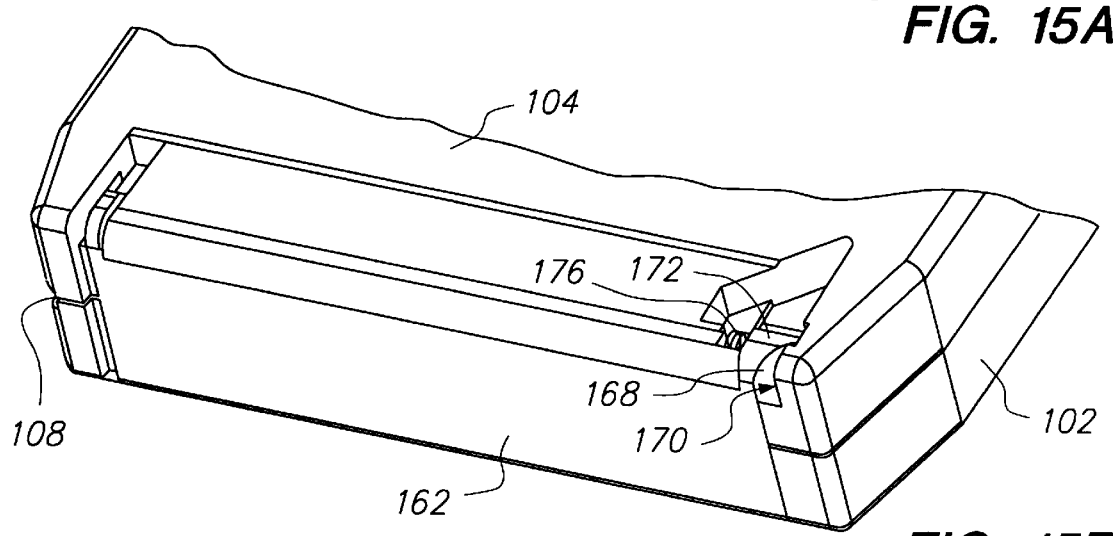
Figure 15C:
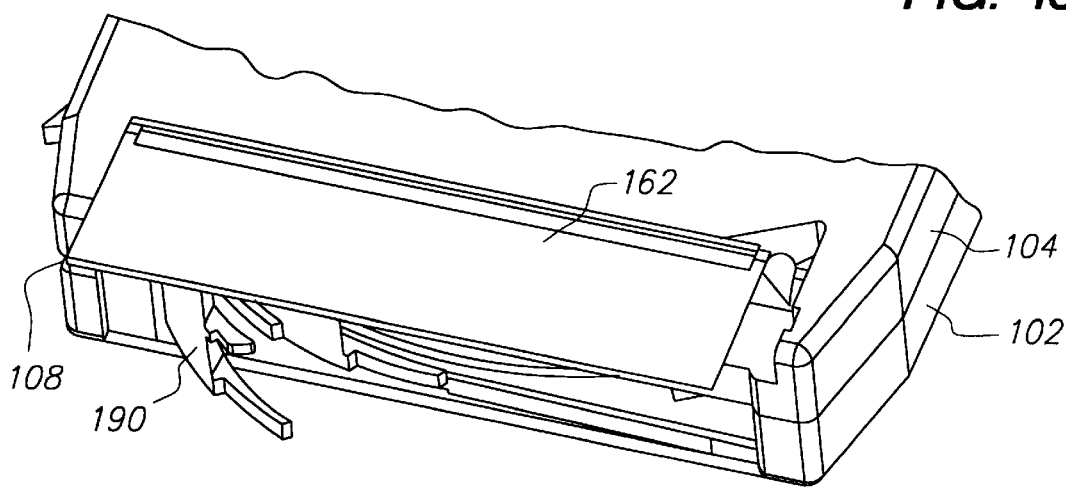

As shown in FIGS. 15A–C, the front wall of the mini-cartridge 100 defines the elongated opening 160. As shown in FIG. 9, the door 162 includes two pivot pins 164 and 166 at opposite ends. The pivot pins engage journals 165 and 167 defined in the upper shell 104 of the cartridge 100. An angled corner surface 168 of the door 162 is contacted by a door opening pin (not shown) positioned at a location 170 as the cartridge enters the adapter 200. As shown in FIG. 15B a release force at position 170 pushes the door 162 first to the left to move a door lock boss 172 out of a notch 174 formed in the upper shell 104 thereby to release the door 162 and permit it to rotate upwardly to an opened position shown in FIG. 15C. A helical compression spring 176 shown in FIGS. 9 and 15B is placed on pin 166 with one end engaging the door 162 and the other end engaging the upper shell 104 such that the spring 176 simultaneously urges the boss 172 into the groove 174 and the door 162 into the closed position shown in FIG. 15B. The journals 165 and 167 are slotted, and permit the pins 164 and 166 to slide rearwardly in the door-open position by a predetermined small amount, such as 0.150 inch, so that the door 162 fits entirely within an interior space defined by the cartridge adapter 200.

Figure 16A:
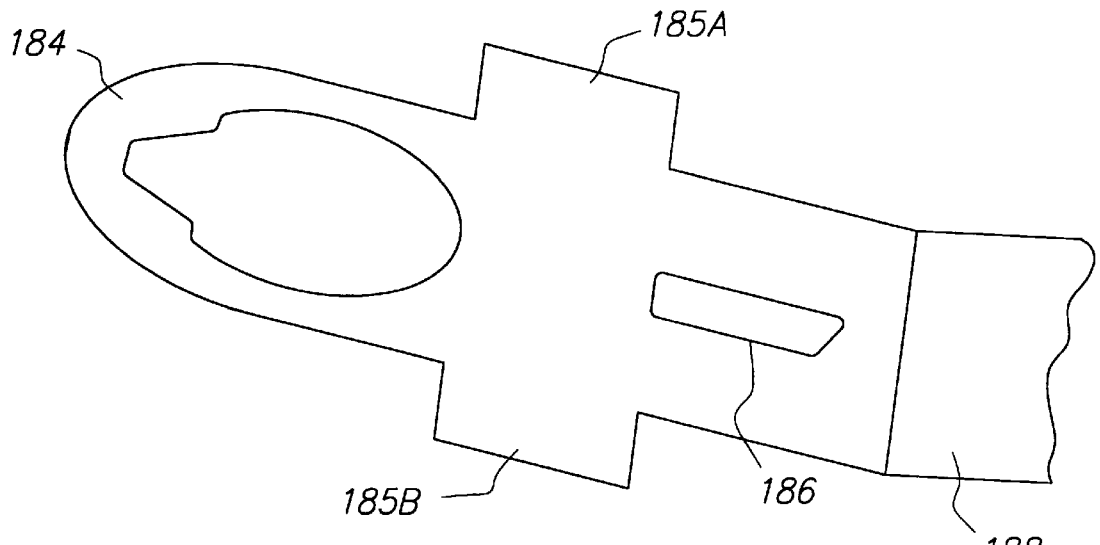

FIG. 16A illustrates the leader buckle 184 used for buckling the mini-cartridge tape leader 188 to a complementary drive leader in accordance e.g. with the standardized buckling arrangement illustrated in commonly assigned U.S. Pat. No. 4,572,460 discussed above. The buckle 184 includes two laterally extending buckle ears or tab extensions 185A and 185B, and a longitudinally central detent slot 186. The leader buckle 184 is designed to be engaged and captured by the pivoting leader guide 190 as shown in FIGS. 6, 9, and 11.

Figure 16B:
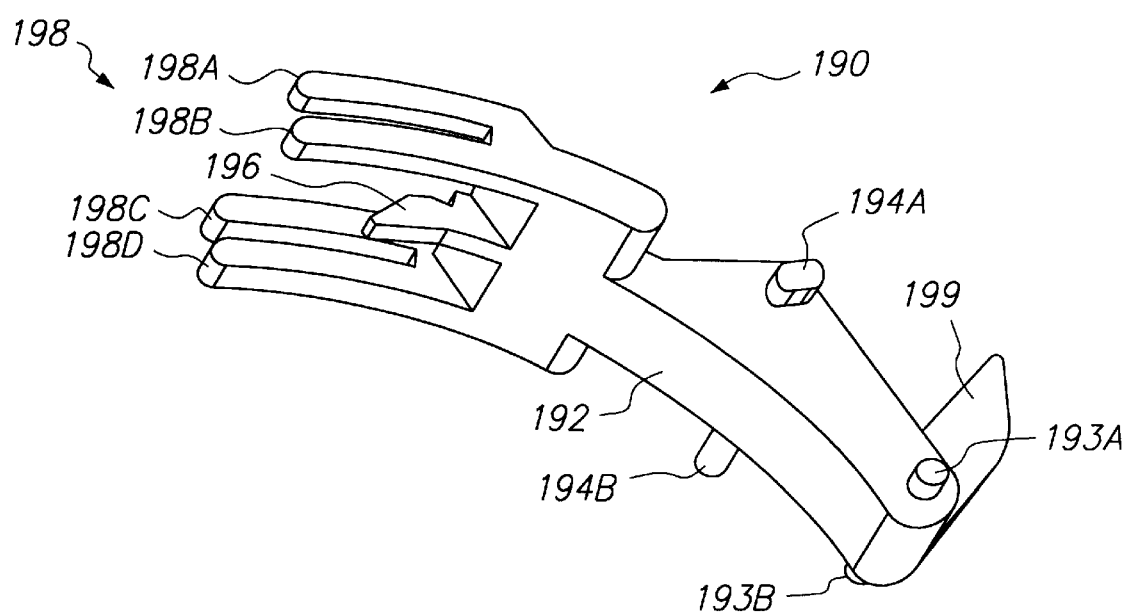

The pivoting tape leader guide 190 is shown in greater detail in FIG. 16B and includes a main body portion 192. The main body portion 192 includes two axially aligned cylindrical rear bosses 193A and 193B, and two axially aligned oblong forward bosses 194A and 194B. These two pairs of bosses 193 and 194 respectively cooperate with boss guides 171 and 173 formed respectively in the bottom shell 102 and top shell 104, as shown in FIGS. 12 and 13. Oblong boss guides 171A and 173A are formed in the bottom shell 102, and curved slot boss guides 171B and 173B are formed in the top shell. The boss guide 171A is aligned with the boss guide 171B, and the boss guide 173A is aligned with the boss guide 173B when the shells 102 and 104 are connected together. The coil spring 191, best seen in the FIG. 11 view, biases the leader guide 190 to the retracted position shown in FIGS. 9 and 11. The boss guides 171A,B and 173A,B guide the leader guide to the extended position shown in FIG. 6 which is required when the mini-cartridge 100 is installed within the cartridge adapter 200.

The boss guides 171A and 171B enable the bosses 193A and 193B to move generally longitudinally in the mini-cartridge, while the boss guides 173A and 173B enable the bosses 194A and 194B to move generally transversely in the mini-cartridge. This forward and sideways movement enables the leader guide 190 to pivot to the extended position shown in FIG. 16C required by the cartridge adapter 200 without stretching the tape, since a true center of rotation of the leader guide 190 lies underneath (and above) the reel 120. In other words, without the longitudinal and transverse degrees of limited relative displacement, an attempt to rotate the leader guide 190 at a pivot point outside the periphery of the reel 120 without first releasing the reel locking mechanisms could result in stretching or tearing of the tape leader 188. While other mechanisms are known to achieve the displacement positions shown in FIG. 16C, such as a three-link mechanism, the present leader guide 190 is preferred because of its simplicity and reliability in operation.

A buckle engagement portion 198 of the tape leader guide 190 includes two slotted engagement fingers: an upper finger formed of tines 198A and 198B, and a lower finger formed of tines 198C and 198D. While single-tine fingers are shown in the FIG. 9 and FIG. 11 views, the double-tine fingers shown in FIG. 16B are most preferred. These two double-tine fingers respectively receive the buckle extensions 185A and 185B of the tape buckle as the tape is completely wound onto the supply reel 120. A detent hook 196 extends from a central web portion of the leader guide body 192 and is dimensioned to receive the buckle detent 186. An opposing lever portion 199 extends from the leader guide body 192 adjacent the bosses 193A and 193B and can be engaged by a pivoting pawl of the cartridge adapter 200 in order to pivot the leader guide outwardly and place the buckle 184 in position to be engaged by a complementary buckle of the conventional large form factor tape drive 80. Otherwise, the coil spring 191 causes the pivoted leader guide to remain at a position adjacent the outer periphery of supply reel 120 of the mini-cartridge. The opposing lever portion 199 is engageable through the elongated slot 108 in the right side wall of the mini-cartridge, see e.g. FIGS. 7, 12 and 13.

Mini-cartridge Adapter 200

Figure 2:
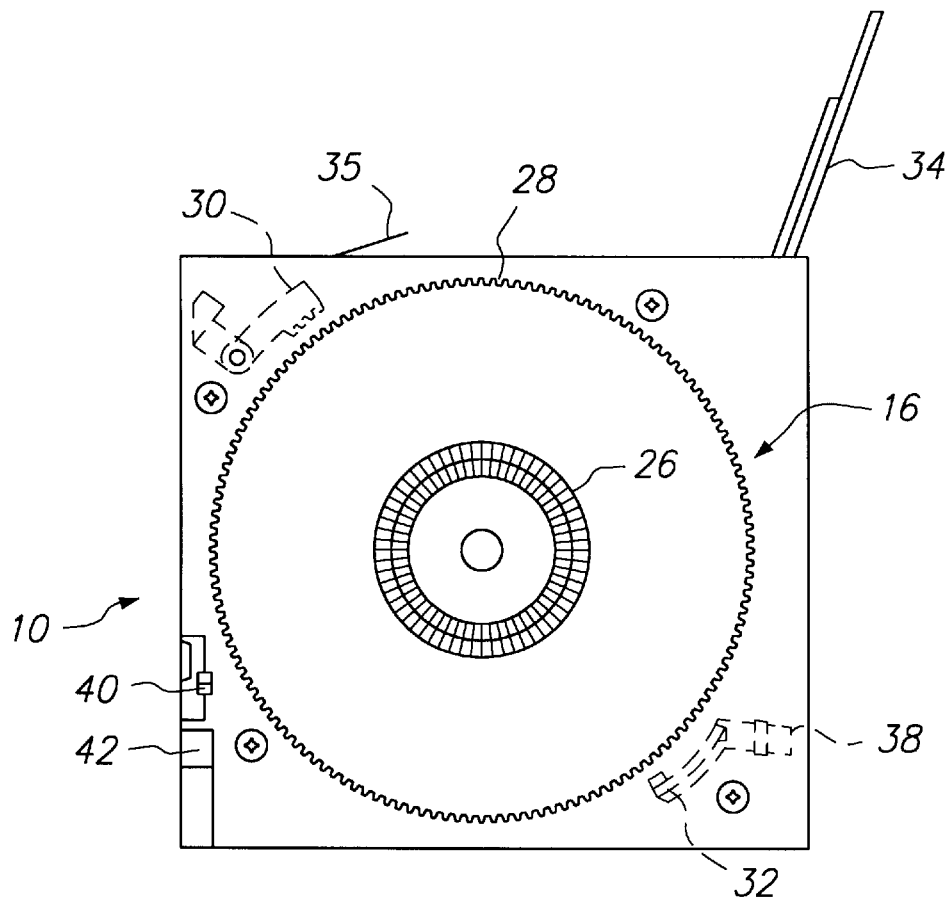
FIG. 2 is a bottom plan view of the FIG. 1 industry-standard tape cartridge showing the reel engagement teeth and reel locks in hidden outline view and showing the door open, exposing a tape buckle.
Figure 3:
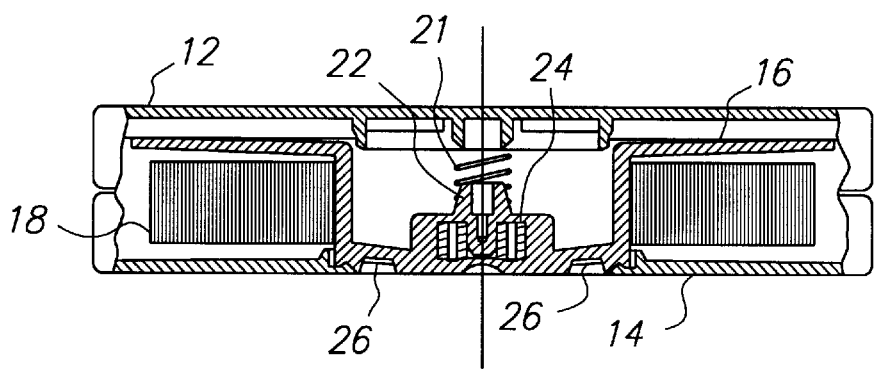
FIG. 3 is a view in elevation and section of the FIG. 1 cartridge showing the spring-loaded reel and tape.
Figure 17:
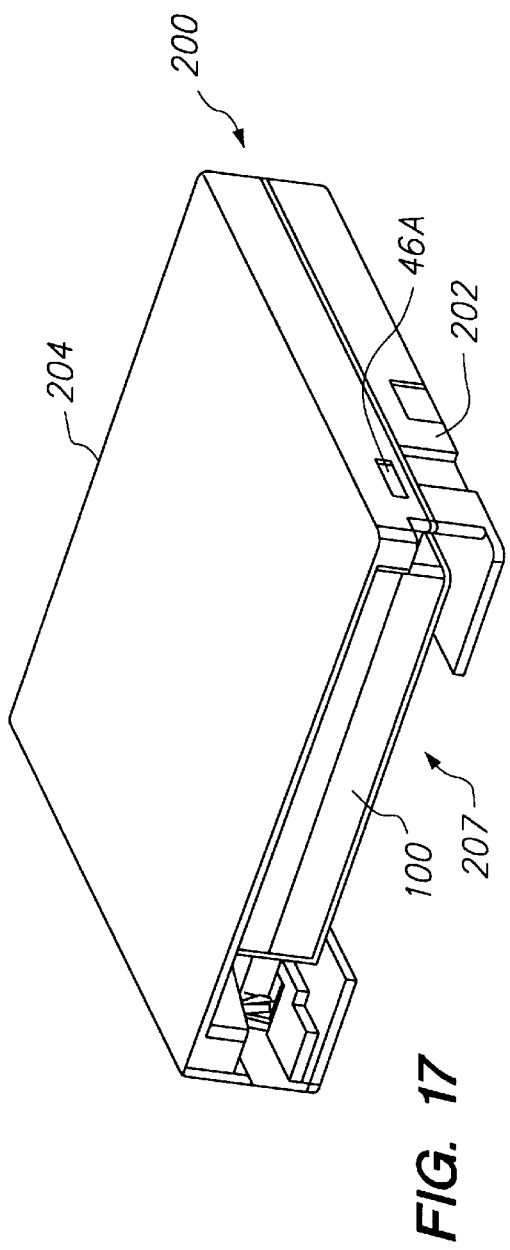
FIG. 17 is an isometric view of the FIG. 5 tape cartridge adapter viewed with the cartridge in place from a cartridge-insertion end of the adapter.

Referring now to FIG. 17, the mini-cartridge adapter 200 includes e.g. a molded plastic lower shell 202 to which a molded plastic upper shell 204 is secured e.g. by threaded screws. As assembled, the mini-cartridge adapter 200 includes all of the specified dimensions and openings of the full-size standardized tape cartridge 10 depicted in FIGS. 1–3, for example. The lower shell 202 includes a central opening 207 sized to admit the cartridge flange 136 of the mini-cartridge 100. FIG. 17 shows the mini-cartridge 100 inserted into and locked within the cartridge adapter 200. In order to emulate the full-sized standardized cartridge 10, the cartridge adapter 200 must present the equivalent functional appearance to the tape drive receiver or tape handling mechanism. Accordingly, in addition to standardized external appearance, a plurality of transfer mechanisms are required to transfer external forces applied to the adapter 200 to appropriate functional locations of the mini-cartridge 100.

Figure 18:
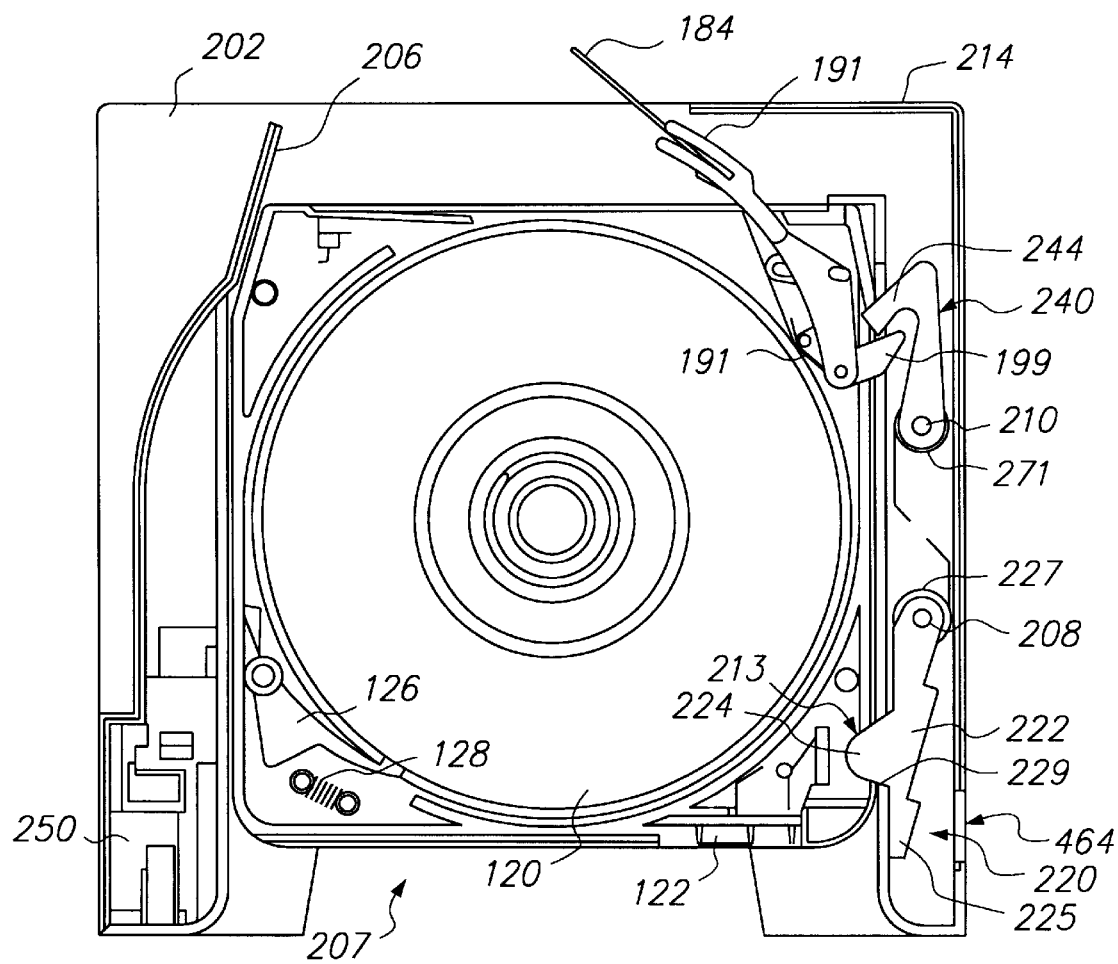
FIG. 18 is a top plan view of the FIG. 5 cartridge adapter and cartridge with upper shells of the adapter and cartridge removed to illustrate mechanical relationships between elements of the cartridge and adapter.

FIG. 18 shows e.g. three cartridge adapter transfer mechanisms: a write protect transfer mechanism 220, a leader guide actuator pawl mechanism 240, and a corner reel lock transfer mechanism 250. Two cartridge adapter journal posts 208 and 210 extend upwardly from a bottom wall of the lower shell 202. The write-protect transfer mechanism 220 is journaled to the post 208, and the leader guide actuator lever mechanism 240 is journaled to the post 210.

Figure 19:
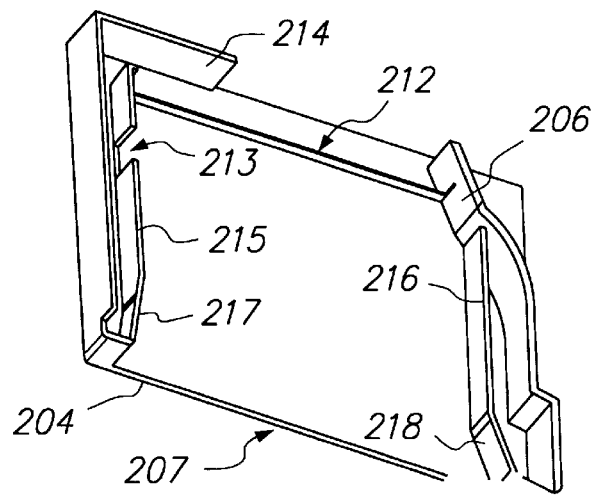
FIG. 19 is an isometric view of an upper shell of the cartridge adapter of FIG. 17.

FIG. 19 shows the inside of the upper shell 204 of the cartridge adapter 200. The angled surface 206 is shown in opposite orientational sense of the orientation of FIGS. 6 and 18. A hard stop transverse lip 212 at the front end of the adapter 200 stops the mini-cartridge 100 at its intended position within the adapter 200, while the angled surface 206 forces the cartridge to rest against an opposite guide rail 215. An opening 213 in the rail 215 admits the leader guide actuator pawl mechanism 240. A front end wall 214 has a major opening therein to permit the leader guide 190 to position the buckle 184 outwardly therethrough. A guide rail 216 on the same side of the shell 204 as the angled wall 206 also guides the mini-cartridge 100 to its desired position. The wall 215 has a flared section 217 extending to the rear opening 207, while the wall 216 has a flared section 218, also extending to the rear opening 207.

Figure 20B:
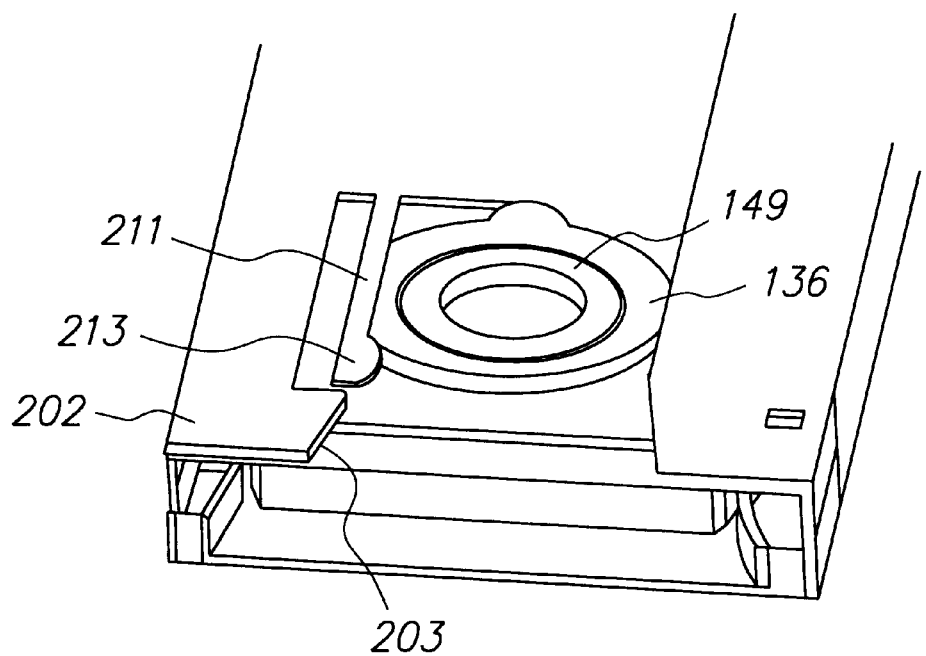
FIGS. 20A and 20B are respectively a bottom isometric view of the cartridge adapter without the cartridge, and a bottom view of the cartridge adapter and cartridge illustrating several keying and snap-locking features to ensure proper relationship between the cartridge and the adapter in accordance with aspects of the present invention.
Figure 20A:
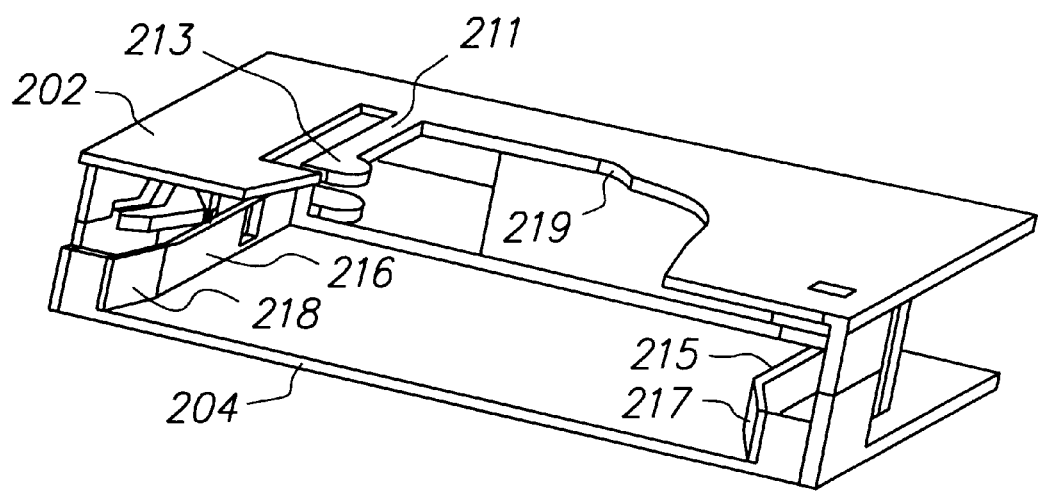

With reference to FIGS. 20A and 20B, the lower shell 202 of the cartridge adapter 200 defines a slot in the major bottom wall for receiving the cartridge ring 136 of the mini-cartridge 100. One edge 203 of the slotted opening is dimensioned to pass the notched edge alignment feature 182 of the ring 136. This arrangement prohibits the mini-cartridge 100 from being inserted into the cartridge adapter 200 backwards. A cantilevered leaf spring 211 extends adjacently to the notched edge feature 182 and includes a detent ball portion 213 which snap-locks the mini-cartridge 100 into the cartridge adapter 200 around the ring 136, as shown in FIG. 20B, for example. A curved edge 219 of the bottom wall 202 is adapted to be engaged by the alignment tab feature 180 which also extends from the mini-cartridge lower ring 136.

As shown in FIGS. 6 and 18, the write-protect transfer mechanism 220 preferably comprises a molded plastic part having a rigid lever body portion 222 which extends from a hub forming a journal at post 208 and has an intermediate angled sensor extension 224 for sensing the position of the write-protect flag 124 of the mini-cartridge (see e.g. FIG. 7). A write protect indicator flag portion 225 is formed at the distal end of the lever body portion 222 and mimics the position of the mini-cartridge write protect mechanism 122 at an external write-protect window 46A in the same position as the window 46 of the standardized conventional cartridge 10. The write-protect transfer mechanism 220 is biased toward the mini-cartridge write-protect window by a coil spring 227 which bears against the sidewall of the lower adapter shell 202 as shown in FIGS. 6 and 18. The rigid lever body 222 has an angled surface 229 between the sensor extension 224 and the flag portion 225 which angles away from the mini-cartridge housing in order to permit the mini-cartridge 100 to be received and withdrawn from the cartridge adapter 200 without presenting an insurmountable obstruction.

The leader guide actuator pawl mechanism 240 functions substantially as a hook which is spring biased by a spring 242 toward the elongated slot 108 of the mini-cartridge 100. The pawl 240 includes a dog-leg hook portion 244 which hooks the arm 199 of the leader guide 190 as the mini-cartridge 100 is inserted into the cartridge adapter 200. Since the location of the pawl 240 is fixed by the location of pivot pin 210, as the cartridge 100 moves into the adapter 200, the pawl 240 causes the leader guide to rotate to the position shown in FIG. 18. The dog-leg hook portion 244 is angled relative to the cartridge 100 such that the cartridge may be inserted and withdrawn from the adapter 200 without obstruction.

Figure 21A:
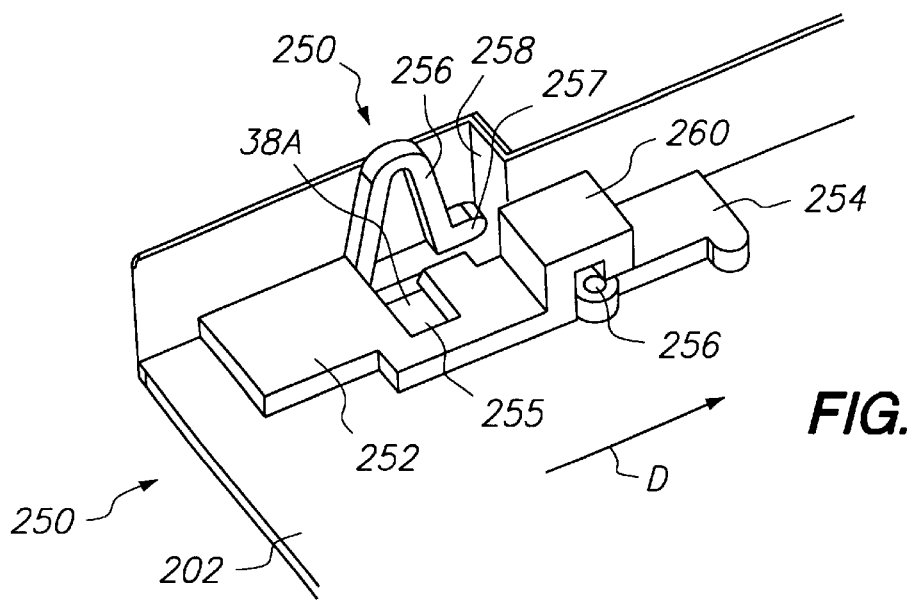
FIGS. 21A, 21B and 21C are respectively an enlarged diagrammatic isometric view of a second reel lock transfer mechanism for transferring a reel lock release force applied to a bottom wall of the cartridge adapter to a side wall opening of the mini-cartridge to release a second reel lock within the mini-cartridge in accordance with aspects of the present invention; an enlarged diagrammatic isometric view of a pivot lever element of the FIG. 21 A transfer mechanism; and, an enlarged diagrammatic isometric view of a link member of the FIG. 21A transfer mechanism.
Figure 21B:
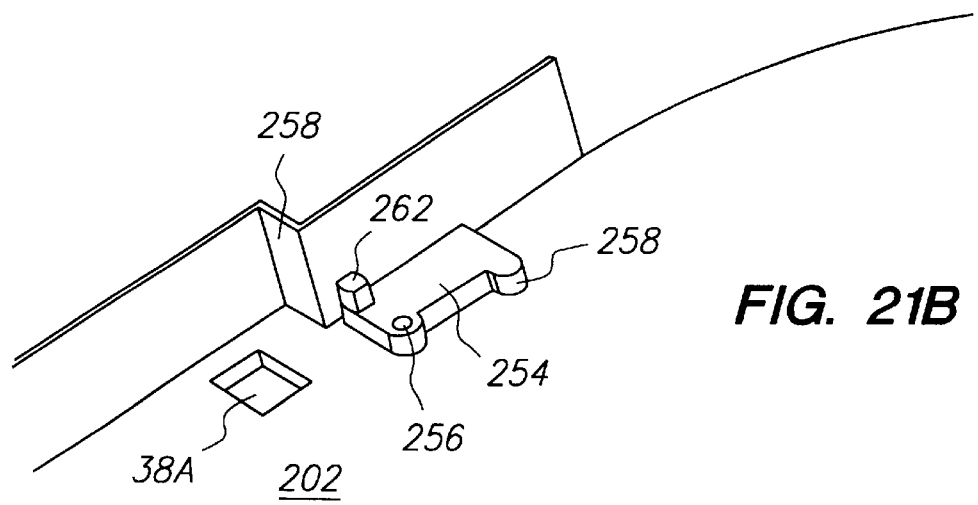
Figure 21C:
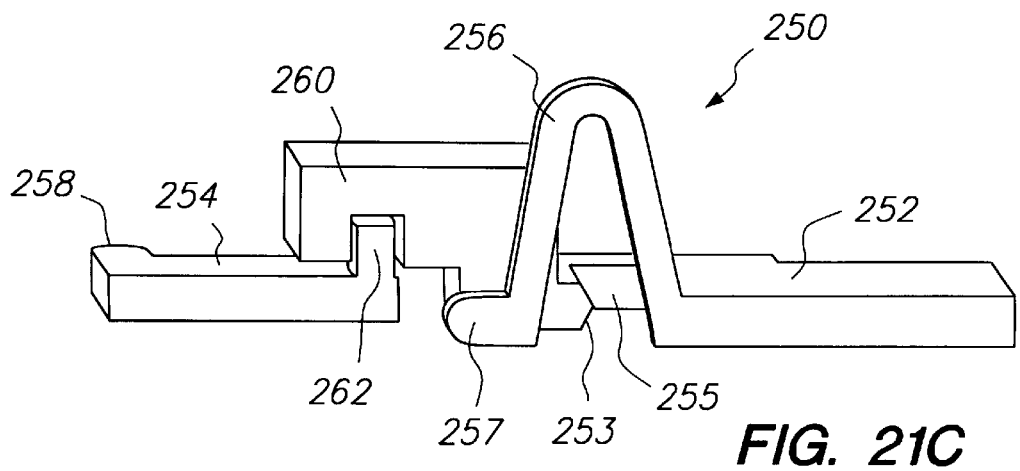

The reel-lock transfer mechanism 250 is shown in detail in FIGS. 21A, 21B and 21C. Therein, the mechanism 250 is seen as including two separate structural elements: a longitudinally displaced link member 252 and a pivot lever 254. Both elements are most preferably formed of a suitable plastic material. The link member 252 has a beveled engagement face in a notch 255 which is located to cover partially the opening 38A formed in the cartridge adapter 200 in the same position as the opening 38 of the standard tape cartridge 10. As was the case with the standard cartridge 10, a release arm 68 enters the opening 38A and moves the link member 252 in a linear motion toward the front of the adapter 200, in the direction indicated by the bold arrow D in FIG. 21A. This displacement is resisted by a horseshoe-shaped live spring 256 having a distal end bearing against a narrow transverse side wall face 258 of the lower shell 202 of the adapter 200.

As shown in FIGS. 21B and 21C, the link member 252 includes a U-shaped portion 260 which engages a crank-pin 262 of the pivot lever 254. The pivot lever 254 is journaled to the base 202 at a journal post 256, and the crank pin 262 is laterally offset from the journal post 256, such that a reel-lock release cam 258 rotates into engagement with the face 146 of rear reel lock 128 via opening 109 in the cartridge lower shell 102 as arm 68 passes through opening 38A, enters notch 255, engages a beveled surface 253 of link member, and drives link member 252 forward.

To those skilled in the art, many changes and modifications will be readily apparent from consideration of the foregoing description of a preferred embodiment without departure from the spirit of the present invention, the scope thereof being more particularly pointed out by the following claims. For example, some aspects and features of the present invention may readily be adapted and applied to storage disk cartridges and storage disk cartridge adapters, and the like. The descriptions herein and the disclosures hereof are by way of illustration only and should not be construed as limiting the scope of the present invention which is more particularly pointed out by the following claims.

What is claimed is:

1. A tape cartridge having a box-shaped cartridge housing including a top major wall and a bottom major wall and sidewalls between the top major wall and bottom major wall, a reel in the housing and containing a supply of recording tape coiled thereon, the reel having at least one lower flange adjacent to the bottom major wall and a toothed spindle ring sized and positioned for engagement by a standardized spindle drive ring of a tape drive, the said bottom major wall defining an annular region of housing locking teeth facing the lower flange of the reel and adjacent an opening for receiving the toothed spindle ring bias spring means for applying a bias force from the top major wall to the reel, the reel including an annular region of reel locking teeth aligned and pitched for engaging the housing locking teeth when the reel is spring biased into contact with the bottom major wall, and further comprising at least one separately actuated reel lock mechanism for releasably locking the reel toward the bottom major wall to prevent axial displacement of the reel locking teeth away from engagement with the housing locking teeth.

2. The tape cartridge set forth in claim 1 wherein the reel lock mechanism comprises a spring biased rotating locking arm having a curved locking dog portion for forcing a peripheral edge region of the lower flange toward an adjacently facing portion of the lower major wall.

3. The tape cartridge set forth in claim 2 wherein the spring biased rotating locking arm is biased by a metal coil spring in tension between the arm and the cartridge housing.

4. The tape cartridge set forth in claim 2 wherein the spring biased rotating locking arm is formed as a unitary plastic structure including a live spring beam section which bears against a side wall of the cartridge housing to apply a bias force in bending mode to a locking arm and the locking dog portion.

5. The tape cartridge set forth in claim 1 wherein the at least one reel lock mechanism is released by application of a external release force applied by a lock release member through an opening defined in a wall of the cartridge.

6. A two-part tape cartridge locking mechanism for releasably locking a rotatable tape reel against rotation within a tape cartridge housing, the locking mechanism including:

a spring bias force-providing means for urging the tape reel against a major wall of the tape cartridge housing along an axis of rotation, a reel locking feature of the reel facing the major wall, and a housing locking feature of the major wall facing the reel locking feature, the reel locking feature engaging the housing locking feature in a contact relationship when the tape reel is forced toward the major wall by the spring bias force-providing means, and a separately actuable reel lock mounted to the housing for holding the tape reel locking feature in the contact relationship with the housing locking feature until the reel lock is separately actuated away from the tape reel.

7. The two-part tape cartridge locking mechanism set forth in claim 6 wherein the separately actuable reel lock comprises a spring-biased rotatable locking arm including a hub journaled to a post of the cartridge housing, a reel-contacting locking dog portion on one side of the hub, and a flag portion on an opposite side of the hub and positioned adjacent to an opening of the cartridge housing for receiving a lock release finger of a tape drive cartridge receiver.

8. The two-part tape cartridge locking mechanism set forth in claim 7 wherein the tape reel includes a reel flange and wherein the reel-contacting locking dog portion engages an outer peripheral region of the reel flange in a reel-locking position.

9. The two-part tape cartridge locking mechanism set forth in claim 7 comprising a coil spring between the rotatable locking arm and the cartridge housing for applying a bias force to bias the rotatable locking arm toward a reel-locking position.

10. The two-part tape cartridge locking mechanism set forth in claim 7 wherein the rotatable locking arm is formed of a resilient material and includes a live spring portion for bearing against the cartridge housing in a manner applying a spring bias force to bias the rotatable locking arm toward a reel-locking position.

11. The two-part tape cartridge locking mechanism set forth in claim 6 wherein the reel locking feature comprises a ring of reel locking teeth, and wherein the housing locking feature comprises a ring of housing locking teeth positioned and pitched to engage the reel locking teeth when the reel is positioned adjacently to the major wall.

* * * * *